United States Patent [19]
Bogdan

[11] Patent Number: 5,936,565
[45] Date of Patent: Aug. 10, 1999

[54] DIGITALLY CONTROLLED DUTY CYCLE INTEGRATION

[75] Inventor: Wladyslaw Bogdan, Ottawa, Canada

[73] Assignee: Nortel Networks Corporation, Montreal, Canada

[21] Appl. No.: 08/988,084

[22] Filed: Dec. 10, 1997

[51] Int. Cl.[6] .................................................. H03M 1/66
[52] U.S. Cl. .......................................... 341/152; 341/144
[58] Field of Search .................................. 341/144, 153, 341/154, 152, 145; 375/238

[56] References Cited

U.S. PATENT DOCUMENTS

| 5,712,636 | 1/1998 | Buch | 341/152 |
| 5,764,173 | 7/1998 | Flynn | 341/152 |

Primary Examiner—Brian Young

[57] ABSTRACT

An inexpensive and reliable DCDCI (digitally controlled duty cycle integration) circuit and method for efficiently converting a digital input signal into a high resolution analog control voltage for use in a variety of closed-loop control systems and more particularly for use in synchronizers. In particular, this invention enables a microsynchronizer to cost-effectively align a clock signal locally generated by a VCXO to multiple incoming clock signals operating at various frequencies for synchronization with a transmitter. The microsynchronizer designed in accordance with this invention integrates APLL and DPLL circuits into a compact and cost-effective design by consolidating analog and digital phase error processing in a PEG (phase error generator) design. The PEG converts the phase error information into differential signals which are subsequently presented to an AC-DC converter for producing high resolution analog control voltages for the VCXO.

58 Claims, 13 Drawing Sheets

DIGITALLY CONTROLLED DUTY CYCLE INTEGRATION

FIELD OF THE INVENTION

This invention relates generally to the generation of high resolution control voltages and more particularly to a digitally controlled duty cycle integration circuit and method for converting digital energy into high resolution analog control voltages for use in communications systems.

BACKGROUND ART

In telecommunication systems, the receiver is assumed to be able to generate a set of local clock signals whose characteristics are identical to the characteristics of the signalling alphabet in use at the transmitter. The alignment of the locally generated clock signals with the clock information extracted from the received signal is often critical in the process of making maximum likelihood symbol decisions. In such situations, a synchronization reference is selected in relation to the modulation protocol employed and extracted from the incoming signal to allow the receiver to keep the frequency or phase of the locally generated clock signals in synchronism with that of the received signal. Examples of synchronization references include the received carrier, the beginning of a frame or the beginning of a symbol of the incoming signal.

Systems using coherent modulation techniques to extract information from the received signal typically use the carrier of the received signal as a synchronization reference because the information transmitted is contained in the phase of the received signal. Carrier synchronization is obtained by aligning the frequency and phase characteristics of the clock signals generated at the receiver to those of the received carrier and is typically accomplished with a PLL (phase locked loop). The PLL achieves frequency and phase synchronism with an input signal by keeping track of the input signal phase to produce an output signal of the same frequency as that of the input signal but with a constant 90° phase offset. The main components of a PLL include a phase detector, a loop filter and a VCXO (voltage controlled crystal oscillator).

The high frequency of a carrier used in telecommunication systems makes the APLL (analog phase locked loop) well suited for carrier synchronization. The APLL usually has a bandwidth large enough to accommodate fast frequency transients in the carrier information extracted from the input signal therefore providing for a faster lock-state acquisition process.

In contrast to coherent systems, systems using non-coherent modulation techniques to extract information from the received signal typically use the beginning of a frame or the beginning of a symbol of the incoming signal as a synchronization reference.

For symbol synchronization, the replica generated at the receiver is a square wave at the symbol transition rate. The symbol rate is much lower than the carrier rate reproduced at the receiver in a system using coherent modulation techniques because each symbol period typically contains a large number of carrier cycles. Similarly, frame synchronization which involves creating a square wave at the frame rate also features a signal of a lower frequency than that of the carrier signal as a frame usually carries a multiplicity of symbols. The square ware created is characterized by zero-crossings coincident with the transitions from one frame to the next.

Frame and symbol synchronization are operated at the receiver on a low frequency synchronization reference and therefore do not necessitate fast lock-state acquisition. They are usually implemented with another type of PLL circuit which is referred to as a DPLL (digital phase locked loop). The DPLL is better suited for low frequency applications because its narrower bandwidth provides a better resolution and accuracy of the output signal characteristics. The DPLL also alleviates some of the problems associated with the APLL, such as for example the sensitivity to dc-drift and the need for calibration and periodic adjustment.

Current DPLLs typically use microcomputers, EEPROM (electrically erasable programmable read-only memory) units and include a DPD (digital phase detector) and a high resolution DAC (digital-to-analog converter) for controlling the VCXO.

Generally, the use of currently available DACs in DPLL designs necessitates the use of a TCVCXO (temperature compensated voltage controlled crystal oscillator). This special type of oscillator is expensive and must be manufactured with a relatively high frequency of oscillation for providing a telecommunication terminal with a wide range of clock signals derived from the output without having to use additional PLLs. However, this high frequency design makes the oscillator more expensive.

The temperature drift is yet another handicap of DAC-based designs that must be compensated. Also, current DAC configurations often present an unsatisfactory control of the phase drift which, as a result, may build-up. These limitations demand additional and expensive circuitry for improving the performance of the DPLL.

The cost of communication systems further increases according to the level of synchronization required in a terminal and mostly in the area of acquisition and tracking loops which often times involve not only hardware, but also software costs. As well, additional costs lie in the extra time required to achieve synchronization before commencing communications, in the energy expended by the transmitter on signals to be used at the receiver as acquisition of tracking aids. These costs increase for example with the transmission rate and the number of transmission channels where improved performance and versatility are necessary.

Accordingly, there is a need for a circuit and method for converting digital energy into high resolution analog control voltages which is simple to implement, cost-efficient and applicable to a variety of telecommunication systems.

The diversity of functionality requirements of current communications systems providing synchronizing capabilities with a synchronization reference operating at various frequencies do not permit an efficient allocation of the resources present at the receiver. As noted above, synchronization references operating at high frequencies necessitate the use of an APLL synchronizer whereas the DPLL can only accommodate low frequency synchronization references. Furthermore, the use of multiple synchronization references which operate at different frequencies makes it desirable for a communication system to provide synchronizing means which can accommodate multiple synchronization references operating at various frequencies.

As such, it is known to provide a telecommunication terminal with synchronization means which can accommodate clock signals operating at various frequencies for synchronization of a receiver and transmitter.

SUMMARY OF THE INVENTION

It is an object of the present invention to obviate or mitigate one or more of the above-identified disadvantages.

This invention provides an inexpensive but reliable DCDCI (digitally controlled duty cycle integration) circuit and method for efficiently converting a digital input signal into a high resolution analog control voltage for use in a variety of closed-loop control systems and more particularly for use in synchronizers.

According to a first broad aspect, the DCDCI circuit is provided for converting a digital input signal into an analog control voltage signal which comprises a PEG (phase error generator) for receiving a DWC (density width code) signal based on the digital input signal to produce a first set of digital signals, each having a duty cycle digitally controlled in accordance with the DWC signal and a converter for generating the control voltage signal from the first set of digital signals.

According to a second broad aspect, the DCDCI circuit is provided for converting one of a digital input signal and a PWM (pulse width modulated) signal into an analog control voltage signal and comprises a PEG (phase error generator) for receiving the PWM signal and a DWC (density width code) signal based on one of the digital input signal and preprogrammed codes to produce a first and second set of digital signals, each having a duty cycle digitally controlled in accordance with the DWC signal and a converter for generating a control voltage signal from one of the first and second set of digital signals.

This invention enables a microsynchronizer to cost-effectively align a locally generated clock signal to multiple incoming clock signals operating at various frequencies for synchronization with a transmitter. Briefly, the microsynchronizer has two basic modes of operation. First, the microsynchronizer operates in an analog mode to locally produce a clock signal in synchronism with a high frequency clock signal extracted from a first incoming signal. Secondly, the microsynchronizer operates in a digital mode to align the locally generated clock signal with a low frequency clock signal extracted from a second incoming signal. The microsynchronizer designed in accordance with this invention integrates APLL and DPLL circuits into a compact and cost-effective design by consolidating analog and digital phase error processing in the PEG design and make this phase error information available in the appropriate form for a VCXO. In particular, the microsynchronizer has a pair of DPDs (digital phase detector) to receive low frequency clock signals and operates in a digital locked mode to continuously compare their respective phase with that of a locally generated clock signal. The results of these phase comparisons are signalled to a CU (control unit) via a digital input signal which is then supplied to the DCDCI circuit by way of the DWC signal. The microsynchronizer also has an APD (analog phase detector) to receive a high frequency clock signal. During analog operations, the APD compares the phase of the locally generated clock signal with that of the high frequency reference clock signal and generates the PWM signal which is directly applied to the DCDCI circuit.

In a preferred embodiment of the invention, the DCDCI circuit has the PEG for receiving the PWM signal and the DWC signal and producing the first and second set of digital signals each with a duty cycle digitally controlled in accordance with the DWC signal. In particular, the PEG has a clock signal selector for selecting a clock signal having a predetermined pulse density and width from one of a low frequency clock signal and a high frequency clock signal, a pulse density dividing circuit to control the pulse density of the clock signal based on the DWC signal for producing the first and second set of digital signals with one of a coarsely adjusted duty cycle and a finely adjusted duty cycle and a first and second pulse width extender to control the pulse width of the clock signal based on the DWC signal for producing the first and second set of digital signals with the other of a coarsely adjusted duty cycle and a finely adjusted duty cycle. This digital control of the duty cycle effected in the PEG provides the microsynchronizer with the cost-efficient advantages of fast lock-state acquisition and a highly stable lock condition. The DCDCI circuit further has the AC-DC converter for generating the analog control voltage signal from one of the first and second set of digital signals. The AC-DC converter includes an analog error amplifier and a digital error attenuator which have their output selectively coupled to an integrator through a digital switch. The analog control voltage is then supplied to a VCXO (voltage-controlled crystal oscillator) through a ripple filter. The VCXO output signal is fed back to the APD and DPDs to be phase compared with the incoming clock signals for synchronizing the host receiver with the transmitter.

In an another embodiment of the present invention, the DCDCI circuit has the same PEG unit for receiving the PWM signal and the DWC signal. However, the digital error attenuator, the analog error amplifier and the integrator of the AC-DC converter are combined into a simpler circuit. The AC-DC converter is connected to the ripple filter which is, in turn, coupled to the VCXO. The VCXO produces a clock signal from which the host receiver derives a series of clock signals with different frequencies through an external PLL and a frequency dividing unit.

The DCDCI circuit designed in accordance with this invention eliminates the need for expensive off-shelf DAC and TCVCXO and can be easily implemented by using existing logic gates available at the control terminal or by way of an integrated circuit.

Advantageously, the cost of a synchronizer based on the present invention is significantly reduced by eliminating the DAC and by replacing the TCVCXO with an off-shelf lower frequency VCXO. In most applications, these replacements may reduce the overall cost of the synchronizer by more than 50%.

The elimination of the DAC also results in a better control of the temperature drift and substantially reduces the build-up of the VCXO output clock phase.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1A:
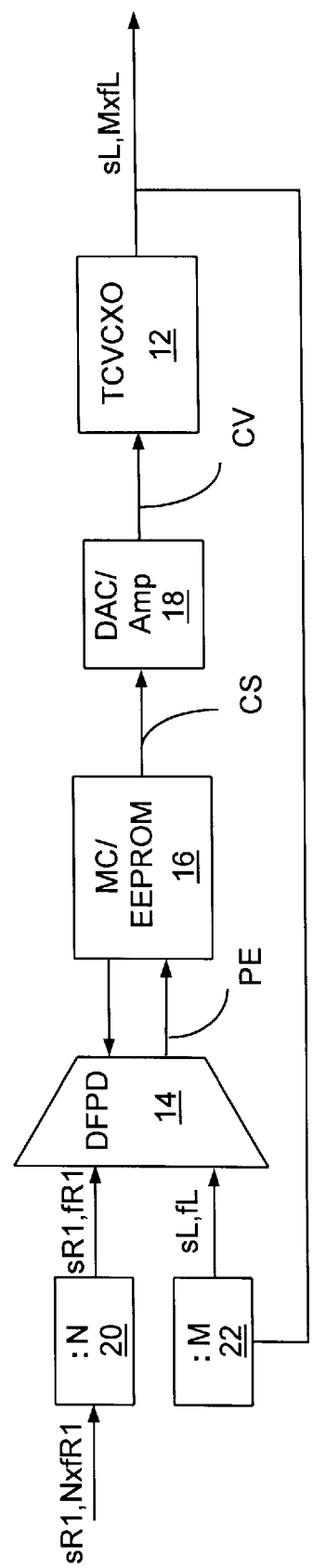
FIG. 1A is a block diagram of a first conventional DPLL synchronizer based on a DAC (digital-to-analog converter) configuration.

Referring firstly to FIG. 1A, a conventional DPLL (digital phase locked loop) portion of a receiver synchronizes a locally generated clock signal sL with a reference signal sR1. More particularly, the signal sL of frequency fL is frequency and phase compared with the reference signal sR1 recovered from the incoming data and operating at a frequency fR1. The comparison is effected in a DFPD (digital frequency phase detector) 14. After the loop is locked on the desired frequency during acquisition mode, the phase error is corrected using a digital phase error signal PE, which is a measure of the difference between the phases of the local clock sL and the reference clock sR1. PE is processed by a microcontroller 16, which also includes an EEPROM (electrically erasable programmable read-only memory), to obtain a digital control signal CS. CS is thereafter converted to an analog control voltage in a DAC (digital-to-analog converter) amplifier unit 18. The analog control voltage is supplied to a TCVCXO (temperature compensated voltage controlled crystal oscillator) to locally produce sL with a frequency of oscillation MxfL in the tens or hundreds of MHZ range. The TCVCXO 12 is an expensive component designed to respond to CV (control voltage) steps having a resolution less than one millivolt. It is to be understood that both fL and fR1 are obtained by dividing the frequency of the respective signals sL and sR using a corresponding frequency divider 20, 22.

Figure 1B:
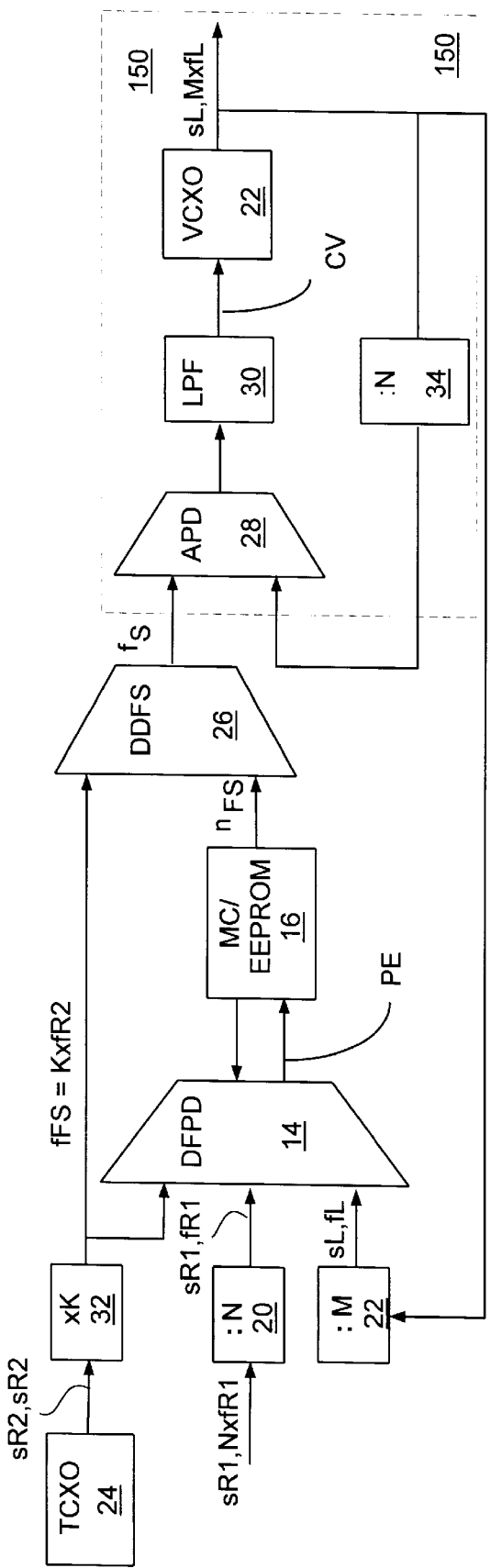
FIG. 1B is a block diagram of a second conventional DPLL synchronizer based on a DDFS (direct digital frequency synthesis) configuration.

FIG. 1B illustrates another type of DPLL currently used for frame synchronization. In this example, the reference frequency fR1 is extracted from the incoming data and compared with the local frequency fL in the DFPD 14, the phase error PE being applied to the microcontroller 16. The local oscillator is a VCXO (voltage controlled crystal oscillator) 22, which is less expensive than the TCVCXO 12 of FIG. 1A. The control voltage CV is precisely generated using the microcontroller 16, a DDFS (direct digital phase synthesis) circuit 26, an APD (analog phase detector) 28 and a LPF (low pass filter) 30. The APD 28, LPF 30, VCXO 22 and a frequency divider 34 form an APLL (analog phase locked loop) generally indicated by 150. The TCXO (temperature controlled crystal oscillator) 24 is also used for providing a second reference signal sR2 of frequency fR2 which is multiplied K times in a frequency multiplier 32 before being used as a reference to the DFPD 14 for improving the resolution of the DPLL. The TCXO 24 also provides a stable frequency which is used by the DDFS circuit 26 to synthesize an output signal sS having a frequency fS and used by the APLL (analog phase locked loop) for generating the local clock signal sL. The frequency dividers 20, 22 and frequency multiplier 32 provide a flexible DPLL design applicable to various fL/fR combinations.

Figure 2:
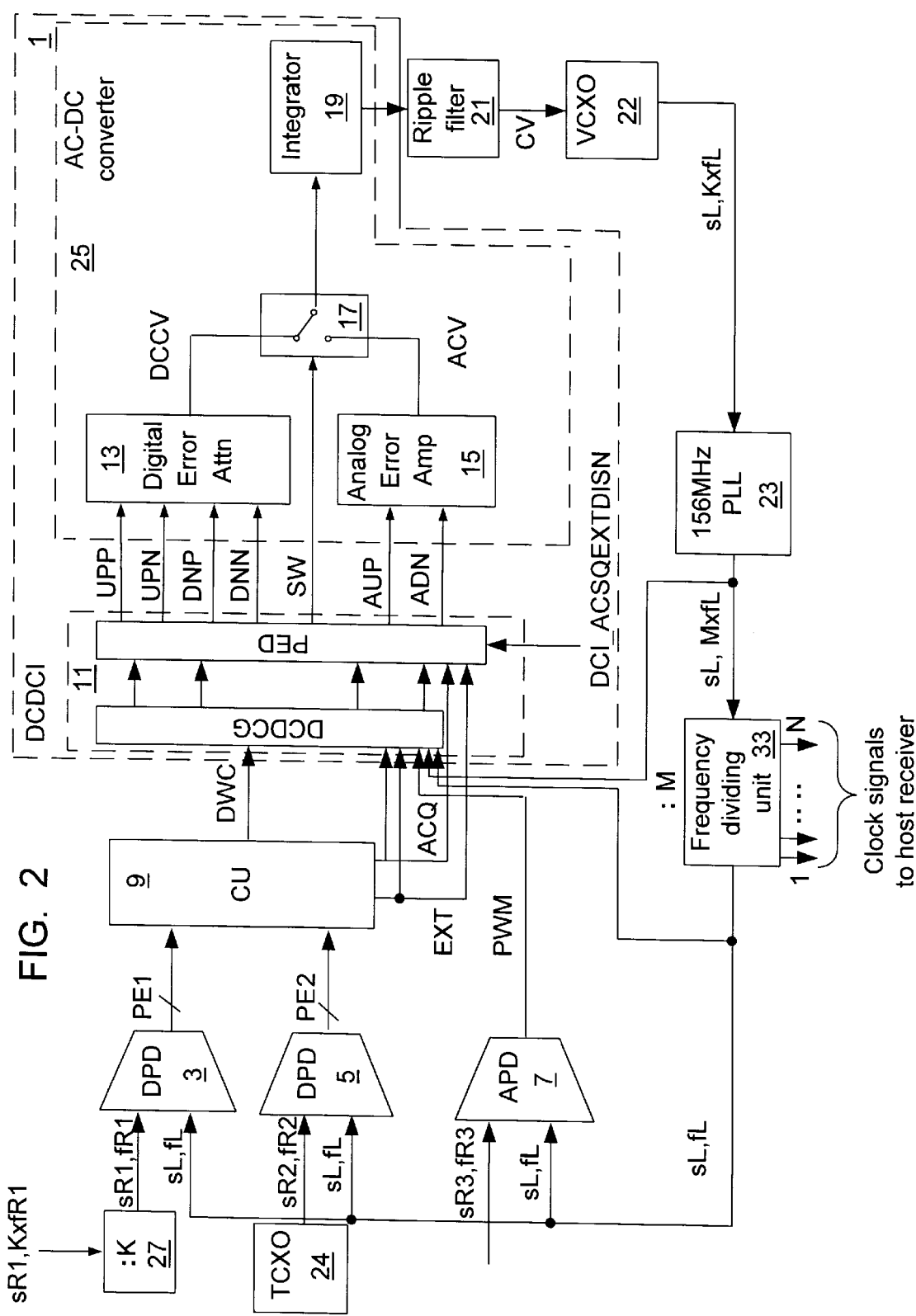
FIG. 2 is a block diagram of a microsynchronizer incorporating a DCDCI (digitally controlled duty cycle integration) circuit according to an embodiment of the invention.

Referring now to FIG. 2, a microsynchronizer implemented with a DCDCI circuit 1 synchronizes a host receiver with a transmitter by aligning the locally generated clock signal sL of frequency fL with reference clock information extracted from an incoming signal. For low frequency reference clock signals such as the 8 KHz SONET frame clock signal, the microsynchronizer operates first in a digital acquisition mode followed by a digital locked mode for enabling the VCXO 22 to locally generate the clock signal sL of frequency fL, through a 156 MHz PLL (phase locked loop) 23 and a frequency dividing unit 33 and in synchronism with the reference clock signal sR1 having the low reference frequency of fR1.

The frequency fL of signal sL is also continuously monitored to detect any phase shift caused by temperature fluctuations of the microsynchronizer and adjusted in accordance with the local reference clock signal sR2 having the frequency fR2 and generated by the TCXO (temperature-controlled oscillator) 24. Synchronism with high frequency reference clock signals such as, for example, the OC-1 (optical carrier at level 1) SONET (synchronous optical network) 51.84 MHz carrier clock signal is effected by the microsynchronizer when consecutively operating in an analog acquisition mode and an analog locked mode for generating the VCXO 22 output clock signal sL of frequency fL through the 156 MHz PLL 23 and frequency dividing unit 33 in alignment with the reference clock signal sR3 having a high reference frequency fR3.

More particularly, the microsynchronizer has a first DPD (digital phase detector) unit 3 coupled to receive sR1 through a frequency divider 27. The microsynchronizer also has a second DPD unit 5 to receive sR2 which is generated by the TCXO unit 24. The first and second DPDs 3, 5 are also coupled to receive the local clock signal sL operating at the frequency fL and respectively produce an output signal PE1 (phase error 1), PE2 (phase error 2) to a CU (control unit) 9 which supplies its output signal DWC (density width codes) to a PEG (phase error generator) unit generally indicated by 11.

The microsynchronizer further has an APD (analog phase detector) 7 which also supplies its output signal PWM (pulse width modulated) to the PEG unit 11. The PEG unit 11, which is the first component of the DCDCI circuit 1, is further detailed below with reference to FIGS. 3, 4, 5 and 6 but can be now briefly described as having a DCDCG (digitally controlled duty cycle generator) 31 coupled to a PED (phase error drivers) 32 for producing a first set of differential ECL (emitter coupled logic) signals UPP (up positive)/UPN (up negative), DNP (down positive)/DNN (down negative) and a second set of differential ECL signals AUP (analog up)/ADN (analog down) which are supplied to an AC-DC (alternating current-direct current) converter generally indicated by 25. The AC-DC converter 25 is the last component of the DCDCI circuit 1 and provides high resolution control voltages to the VCXO 22 for producing the clock signal sL of frequency KxfL to the 156 MHz PLL 23. The AC-DC converter 25 is further described below with reference to FIG. 7 but can also be briefly described now as having a digital error attenuator 13 and an analog error amplifier 15 respectively coupled to the PED 32 to receive the UPP/UPN, DNP/DNN and AUP/ADN differential ECL signals. The AC-DC converter 25 also has an integrator 19 coupled to selectively receive the output of the digital error attenuator 13 and analog error amplifier 15 through a digital switch 17. The integrator 19 is connected to a ripple filter 21 which is external to the AC-DC converter 25 and coupled to the VCXO 22 for producing the signal sL with a frequency KxfL. The signal sL is then fed to the 156 MHz PLL 23 to be regenerated at the frequency MxfL and supplied to both the CU 9 and the frequency dividing unit 33.

The frequency dividing unit 33 produces the clock signal sL of frequency fL to the DPDs 3, 5 and CU 9 but is also coupled to provide the host receiver with a plurality N of clock signals synchronized to the low frequency reference clock signal sR1 or the high frequency reference clock signal sR3. The selection of the operational reference clock signal is signalled by the CU 9 to the PEG unit 11 of the DCDCI circuit 1 via an EXT (external) signal.

In operation, the microsynchronizer provides the host receiver with N clock signals derived from the VCXO output signal sL. When the microsynchronizer is operating in a digital locked mode, these clock signals are in synchronism with the low frequency reference clock signal sR1. When the microsynchronizer functions in an analog locked mode, the clock signals generated are aligned with the high frequency reference signal sR3. As noted before, to achieve synchronism with the low frequency reference signal sR1, the microsynchronizer operates first in the digital acquisition mode followed by the digital locked mode. Similarly, synchronism with the high frequency reference signal sR3 is effected by the microsynchronizer when consecutively operating in the analog acquisition mode and analog locked mode. The selection of each mode of operation described above is assured by the CU 9 with the EXT signal and an ACQ (acquisition) signal applied to the PEG 11 where the EXT signal determines which of the analog and digital modes of operation is selected whereas selection between the acquisition and locked modes of operation, whether analog or digital, is effected with the ACQ signal.

In the digital or analog acquisition modes of operation, the microsynchronizer seeks to attain a loop frequency that is equal to the reference frequency of interest with a constant phase offset. In particular, when operating in a digital acquisition mode, the frequency of interest is the low frequency fR1 of the signal sR1 received in DPD unit 3, which can be as noted above, the 8 KHz SONET frame clock signal. When operating in an analog acquisition mode, the reference frequency of interest is the high frequency fR3 of the signal sR3 received in the APD 7, which can be, as noted before, the OC-1 SONET 51.84 MHz carrier clock signal.

However, as the minimum time necessary to attain a DDPL or APLL lock state is dictated by their respective loop bandwidth, the microsynchronizer initially uses its DWC output signal to drive the PEG unit 11 with programmed phase error codes stored in the CU 9 so as to accelerate, to the maximum extent possible, the DPLL acquisition process for low frequency signals or the APLL acquisition process for high frequency signals, depending on which frequency loop is operational.

The PEG unit 11 receives the phase error codes from the CU 9 and selectively generates the first set of differential ECL signals UPP/UPN, DNP/DNN or the second set of differential ECL signals AUP/ADN based on the operational mode of the microsynchronizer. When the first set of differential ECL signals UPP/UPN, DNP/DNN is generated, the phase error information converted by the PEG unit 11 is contained in the pulse density and width difference between ECL signals UPP/UPN and DNP/DNN while the phase error information converted when the second set of differential ECL signals AUP/ADN is generated is only contained in the respective pulse width of AUP and AUN.

The set of differential ECL signals generated is applied to the AC-DC converter 25 (further detailed below with reference to FIG. 7) where the phase error information is extracted and converted into high resolution analog control voltages for use by the VCXO 22. When the first set of differential ECL signals is received, the control voltages generated therefrom are directly proportional to the pulse density and width difference between the UPP/UPN and DNP/DNN signals described above, while the control voltages generated from the second set of differential ECL signals AUP/ADN are only proportional to the pulse width of AUP and ADN. The differential ECL signals UPP/UPN, DNP/DNN are fed to the digital error attenuator 13 while the AUP/ADN signals are received by the analog error amplifier 15. The digital switch 17 is controlled by the PEG unit 11 with the SW signal, to selectively connect the outputs of respective digital error attenuator 13 and analog error amplifier 15 to the VCXO 22 through the integrator 19 and ripple filter 21 according to the microsynchronizer's mode of operation. The VCXO 22 produces the output signal sL of frequency KxfL which is multiplied to become 156 MHz due to the presence of the 156 MHz PLL 23. Such multiplication of the frequency KxfL to obtain the higher frequency 156 MHZ is necessary to derive, in the frequency dividing unit 33, N clock signals with respective frequencies high enough to appropriately accommodate the needs of the host receiver.

For the purposes of attaining a stable digital frequency loop during digital operations, the signal sL of frequency fL is produced by the frequency dividing unit 33 and fed back into the DPD 3 where it is compared with sR1 whereby the corresponding phase error signal PE1 is generated and supplied to the CU 9. The CU 9 generates the DWC signal based on PE1 and supplies it to the PEG unit 11. During analog operations, the signal sL of frequency fL is fed back into the APD 7 where it is phase compared with sR3 to produce the PWM output signal directly to the PED 32 of the PEG unit 11. As the phase error is optimally controlled (this may be, for example, when the phase error falls within the bandwidth of the operational frequency loop), the PEG unit 11 no longer generates its differential ECL signals based on programmed codes received from the CU 9 but rather on digital phase error information obtained from the DPD 3 and converted into digital codes by the CU 9 for digital operations or, for analog operations, on analog phase information received directly from the APD 7 with the PWM signal.

In the digital locked mode of operation, the microsynchronizer provides a DPLL of the low frequency reference signal sR1. In this mode of operation, the DPD 3 receives the sR1 signal of frequency fR1 from the frequency divider 27. SR1 which can be, as noted before, the 8 KHz SONET frame clock is compared to the local clock signal sL also received in the first DPD 3 from the VCXO 22 and through the frequency dividing unit 33. The resulting phase deviations of sL in reference to sR1 measured in DPD 3 are supplied to the CU 9 for processing via the phase error signal PE1.

The local clock signal sL is also compared in the second DPD 5 with the fixed reference clock signal sR2 and generated by TCXO 24 to detect and compensate for undesirable phase drifts of the sL signal caused by inevitable variations in the electronic behavior of the microsynchonizer which are a direct result of temperature fluctuations of the host receiver. This fixed reference clock signal can be, for example, a Stratum-3 SONET clock. Similarly to the PE1 signal generated by the DPD 3, the phase error signal PE2 generated by the second DPD 5 is also applied to CU 9 to be processed and transformed into a sequence of codes which are subsequently presented to the PEG unit 11 via the DWC signal. These codes together with other control signals generated by the CU 9 provide the PEG 11 with both coarse and fine tuning means to digitally control the duty cycle of UPP/UPN and DNP/DNN based on the phase error information received from the CU 9.

As the first set of differential ECL signals is generated in this mode, the phase error information converted by the PEG unit 9 is contained in the pulse density and width difference between the UPP/UPN and DNP/DNN signals. The PEG unit 11 forwards these ECL signals to the AC-DC converter 25 where the phase error information is extracted and converted into high resolution analog control voltages for the VCXO 22.

More particularly, the PEG unit 11 applies UPP/UPN and DNP/DNN to the digital error attenuator 13 and selectively sends them to the VCXO 22 through the integrator 19 and ripple filter 21 by appropriately controlling the digital switch 17 with the SW signal (the digital error attenuator 13, integrator 19, ripple filter 21 and digital switch 17 are further described below in relation to the structure and digital operations of the AC-DC converter 25 and in reference to FIG. 7). The control voltages generated are proportional to the pulse density and width difference between the output signals described above. The VCXO output signal sL is fed to the 156 MHz PLL 23 and subsequently to the frequency dividing unit 33 to produce the N clock signals synchronized with sR1 and sR2 with a set of frequencies selected to appropriately meet the clock requirements of the host receiver. The DPLL loop is completed with the signal sL of frequency fL produced by the frequency dividing unit 33 and fed back into the DPDs 3, 5 where it is respectively compared with the reference clock signals sR1 and sR2.

The control voltage applied to the input of the VCXO 22 is respectively calculated in relation to phase error signals PE1 and PE2 in addition to a number of provisioned parameters for the digital loop such as the loop bandwidth and resolution. To align sL with sR1 and sR2, the control voltage is applied to the VCXO 22 until a target phase TP is reached and a corresponding target phase error TPE between the local clock signal sL and the reference signals tracked sR1, sR2 is eliminated. As this occurs, the control voltage applied to the VCXO 22 and the resulting VCXO output clock phase will oscillate around TP to compensate for any undesired deviation of the loop lock until a new TP is calculated. The oscillation of the VCXO output clock phase contributes to the VCXO phase jitter is related to the DPD phase error resolution. The phase error resolution of DPDs 3, 5 of the preferred embodiment of this invention shown in FIG. 2 is found to be less than 0.2 nS which translates into a digital phase jitter with an amplitude of less than 0.2 nS and a frequency of less than 100 Hz.

In the analog locked mode, the microsynchronizer provides an APLL of the high frequency signal sR3. In this mode of operation, the microsynchronizer functions to compare in the APD 7 the local clock signal sL with the high frequency reference signal sR3 for producing the PWM signal which carries information on the phase error measured between sL and sR3. The PWM signal bypasses initial processing in the CU 9 and is applied directly to the PEG 11 which, in turn, produces the second set of differential ECL signals AUP/ADN. As this set of signals is used, the phase error information converted by the PEG unit 9 during the analog locked mode of operation is contained in the pulse width of the respective AUP and ADN signals. The PEG unit 11 forwards the AUP/ADN to the AC-DC converter 25 where the phase error information is extracted and converted into high gain analog control voltages for the VCXO 22 which are proportional to the AUP/ADN pulse width.

More particularly, the PEG unit 11 applies the AUP/ADN ECL signals to the analog error amplifier 13 and selectively sends them to the VCXO 22 through the integrator 19 and ripple filter 21 by appropriately controlling the digital switch 17 with the SW signal (the analog error amplifier 13, integrator 19, ripple filter 21 and digital switch 17 are further described below in relation to the structure and analog operations of the AC-DC converter 25 and in reference to FIG. 7).

The functionality of the PEG unit 11 described above in relation to the microsynchronizer's digital locked mode of operation is not inoperative during APLL operations but remains in function to provide gain adjustment for the APLL loop. In particular, the DWC signal is also used by the CU 9 to adjust the pulse density of the AUP/ADN differential ECL signals generated by the PEG unit 11 for decreasing the APLL loop bandwidth and accommodate different frequency transients. Preferably, to obtain a bandwidth extending from 32 Hz to 2 KHz, the gain adjustment provided by the CU 9 via the DWC signal ranges from 1 to $\frac{1}{128}$.

The AUP/ADN differential ECL signals generated by the PEG unit 11 are presented to the input of the analog error amplifier 15. The PEG unit 11 uses the signal SW as a control for the digital switch 17 to digitally connect the analog error amplifier 15 output to the integrator 19 which provides the control voltage for the VCXO 22 through the ripple filter 21. The VCXO output signal sL is fed to the 156 MHz PLL 23 and subsequently to the frequency dividing unit 33 to produce N clock signals synchronized with sR3. The APLL loop is completed with the signal sL reproduced by the frequency dividing unit 33 with a frequency fL and fed back into the APD unit 7 where it is compared with the clock signal sR3.

Figure 5:
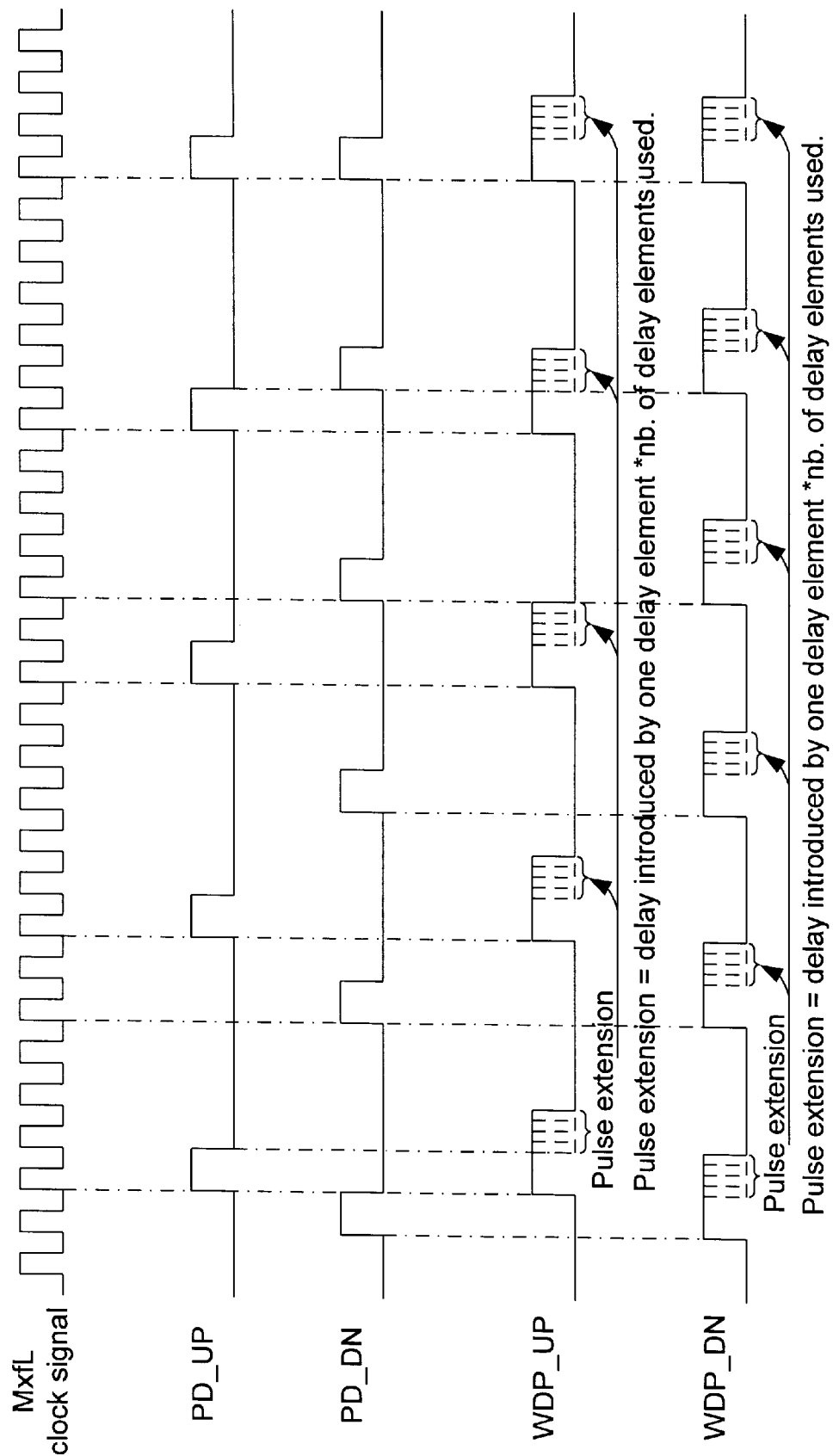
FIG. 5 shows time plots of an exemplary clock signal as it is processed through the DCDCG section of FIG. 3.
Figure 6:
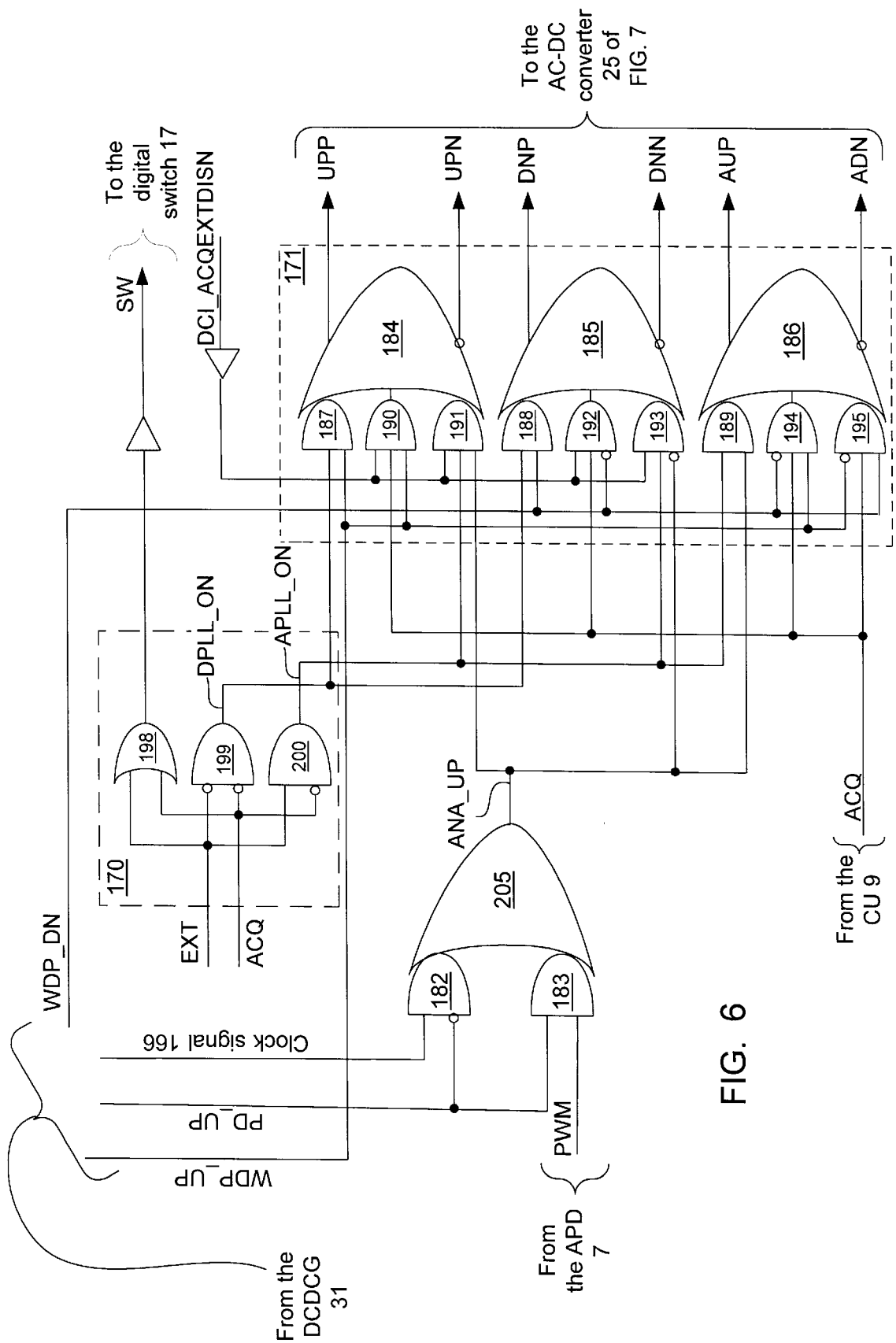
FIG. 6 is a block diagram of a PED (phase error driver) of the PEG unit of FIG. 2.
Figure 7:
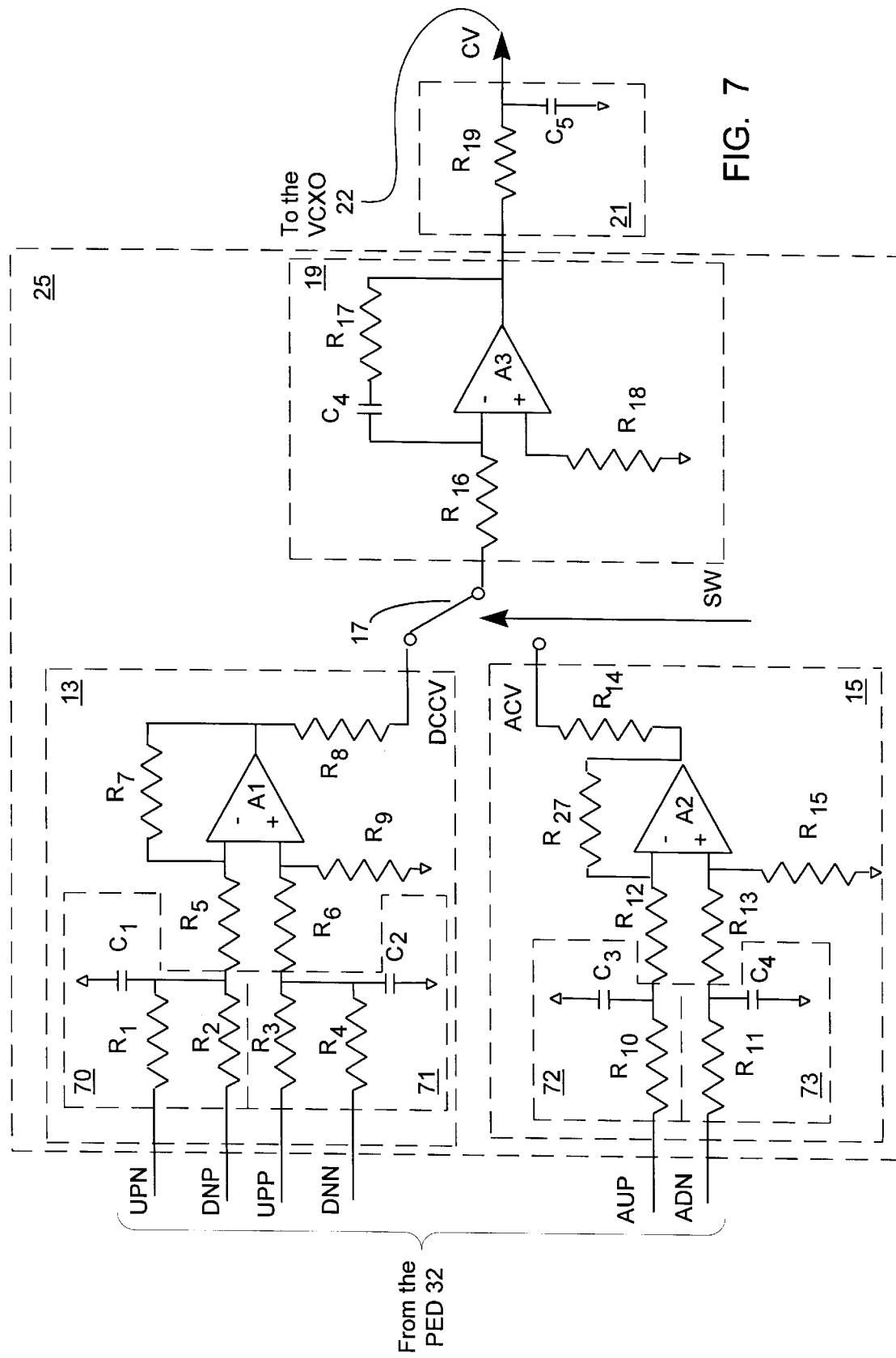
FIG. 7 is a block diagram of an AC-DC converter for use in the DCDCI circuit of FIG. 2.

This section will now describe in detail and with reference to FIGS. 3, 4, 5 and 6, the architecture and functionality of the DCDCG 31 and the PED 32 of the PEG unit 11 in accordance with the present invention and will be followed by a detailed description of the AC-DC converter 25 with reference to FIG. 7.

Figure 3:
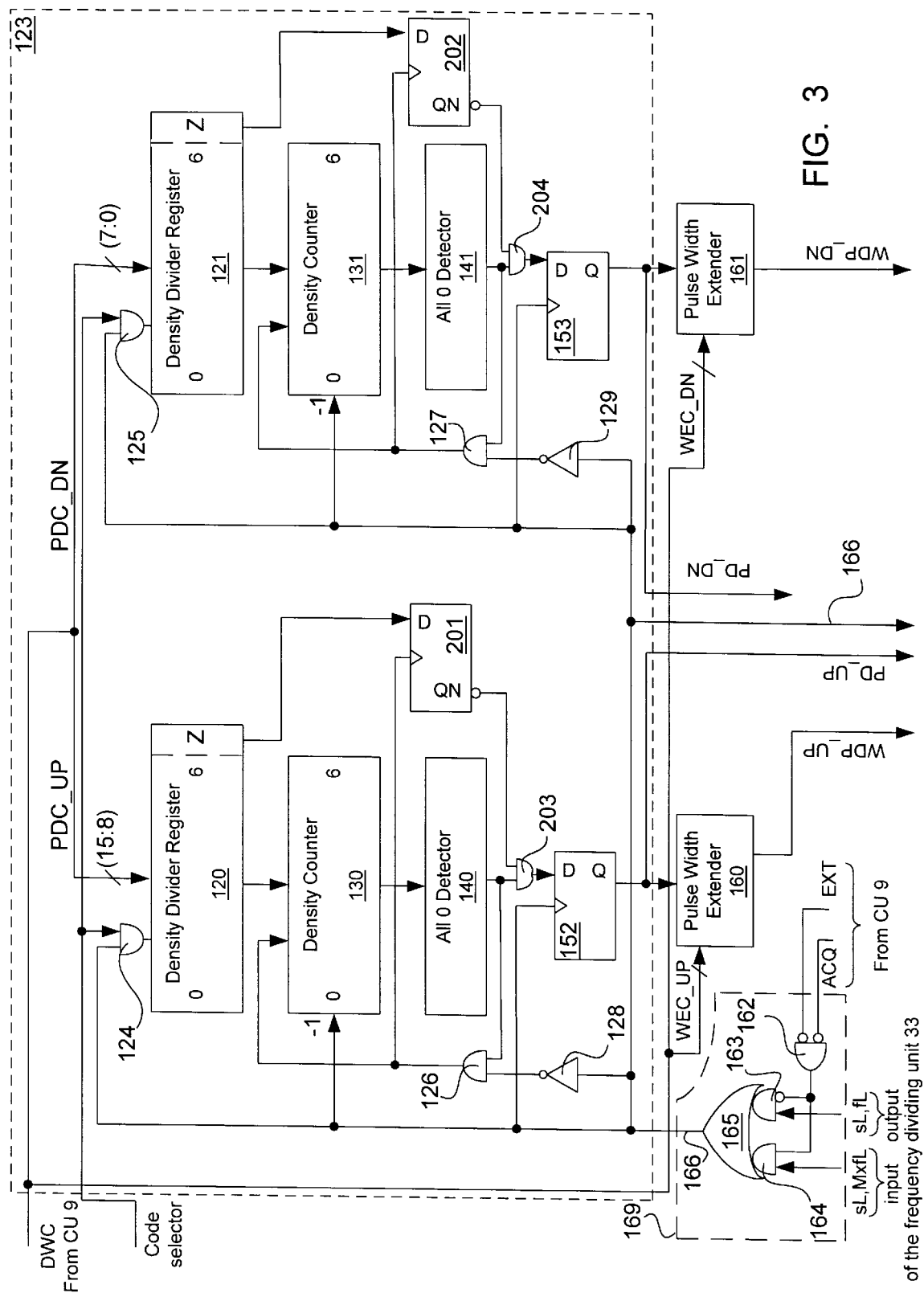
FIG. 3 is a block diagram of a DCDCG (digitally controlled duty cycle generator) section of a PEG unit (phase error generator) illustrated in FIG. 2.

Referring firstly to FIG. 3, the DCDCG 31 of the PEG unit 11 operates to divide down the pulse density and adjust the pulse width of a clock signal 166 for producing a first pair of output signals WDP_UP (width density pulse up), DP_UP (density pulse up) and a second pair of output signals WDP_DN (width density pulse down), DP_DN (density pulse down) each output signal having a duty cycle digitally controlled in accordance with the phase error information received from the CU 9 via the DWC signal. The DCDCG 31 also operates to supply these output signals to the PED 32 of FIG. 2 (further detailed below in reference to FIG. 6) for generating the first set and second set of differential ECL signals, UPP/UPN, DNP/DNN and AUP/ADN.

More particularly, the DCDCG 31 has a PDD (pulse density divider) unit generally indicated by 123 for receiving the DWC signal from the CU 9. The PDD unit 123 is connected to a pair of PWE (pulse width extender) units 161, 160 which are externally coupled to the PED 32 of FIG. 2. The PDD unit 123 is coupled to receive density dividing codes from the CU 9 via the DWC signal while the PWE units 161, 160 are connected to receive width extension codes also by means of the DWC signal. The DCDCG 31 further has a clock generator generally indicated by 169 which receives the EXT and ACQ control signals from the CU 9, the frequency dividing unit input signal sL having the low frequency fL and the associated output signal sL having the high frequency MxfL or 156 MHz for supplying the selectable clock signal 166 to the PDD unit 123.

More particularly, the PDD unit 123 is connected to the CU 9 with a plurality of digital links for receiving the density dividing codes via the DWC signal. The digital links are equally separated into two groups PDC_UP and PDC_DN which are respectively applied to a pair of DDRs (density divider register) 120, 121. The output of each DDR 120, 121 consists of 7 bits with bits 0–6 supplied to a respective DC (density counter) 130, 131 while bit 7 (hereinafter refered to bit Z) is supplied to a DFF (D flip-flop) 201, 202. The DCs 130, 131 supply their respective output to a corresponding A0D (all-zero detector) 140, 141. The output of the A0D 140 has its output ANDed in an AND gate 203 with the inverted Q output of the DFF 201. Similarly, the output of the A0D 141 is ANDed in an AND gate 204 with the inverted Q output of the DFF 202. The PDD unit 123 also has a pair of DFFs 152, 153 internally coupled to receive the output of respective AND gates 203, 204 and externally coupled to respective PWE (pulse width extender) units 160, 161.

The PDD unit 123 regulates its data flow with clock signal information selectively derived from the input and output of the frequency dividing unit 33 of FIG. 2 which respectively have the high frequency MxfL or 156 MHz and the low frequency fL. The selection is operated by a clock selector 169 with the EXT and ACQ control signals received from the CU 9. The clock selector 169 has an invert-AND gate 162 which is coupled to receive the EXT and ACQ signals for producing an output signal which is supplied to the inverting input of an AND gate 163 while the non-inverting input is connected to receive fL. The clock selector 169 has another AND gate 164 which receives the output of the invert-AND gate 162 together with the MxfL clock signal. The AND gates 163, 164 are coupled to an OR gate 165 for producing and supplying the selectable clock signal 166 to the PDD unit 123.

More particularly, this selectable clock signal 166 is supplied to the DDRs 120, 121 through a respective AND gate 124, 125 and directly to the DCs 130, 131 and the FF gates 152, 153. In addition to receiving the clock signal described above, the DC 130 is also coupled to receive a load signal derived from the clock signal 166 and the output signal of the A0D 140. In a similar manner, the DC 130 is connected to receive a load signal also derived from the clock signal 166 and the output signal of the A0D 141. In particular, the clock selector 169 output is supplied to inverters 128, 129 which are respectively coupled to a pair of AND gates 126, 127. The AND gates 126, 127 which are also respectively coupled to receive the output of A0Ds 141, 142 have their output respectively supplied to the DCs 130, 131 and to the DFFs 201, 202.

As noted above, the PDD unit 123 is externally connected to the PWE units 161 and 160. The PWE units 161, 160 are coupled to the CU 9 for receiving the width extension codes via the DWC signal. In particular, the width extension codes are respectively conveyed with a plurality digital links separated into two groups WEC_UP and WEC_DN and respectively applied to the PWE units 161, 160. The PWE units 160, 161 are also connected to the PED 32 (further described below in reference to FIG. 6) for generating the output signals WPD_UP and WPD_DN.

In operation, the DCDCG 31 operates to divide down the pulse density of the clock signal 166 according to phase error information carried by the density dividing codes received from the CU 9 of FIG. 2 via the DWC signal for producing the DP_UP and DP_DN output signals. As will be explained later in further details, these output signals are used only in the analog locked mode of operation of the microsynchronizer. The DCDCG 31 also operates to adjust the pulse width of DP_UP and DP_DN according to phase error information carried by width extension codes and also received via the DWC signal to produce WDP_UP and WDP_DN output signals. These output signals are produced and used during the digital acquisition mode, the analog acquisition mode and the digital locked mode of operation of the microsynchronizer of FIG. 2 (further details below). The functionality of the DCDCG 31 will now be described in more detail in relation to the generation of DP_UP, DP_DN, WDP_UP and WDP_DN and with reference to the various modes of operation of the microsynchronizer of FIG. 2.

DP_UP and DP_DN are generated and obtained by digitally dividing down the pulse density of the clock signal 166 in accordance to the density dividing codes which, as noted above, carry information on the phase error difference between the reference signal of interest and the signal sL generated locally by the VCXO 22 of FIG. 2. The phase error information thus converted is coarsely encoded in the difference between the respective pulse density of DP_UP and DP_DN.

More particularly, the density divider codes received via the DWC signal are first equally split into PDC_UP and PDC_DN, each being respectively applied to the corresponding DDR 120, 121 and loaded therein by the combined occurrences of the rising edge of the clock signal 166 obtained from the clock selector 169 and a code selector provided by the CU 9. This code selector is used to indicate that density dividing codes have been transmitted via the DWC signal and are available for use by the PDD 123.

On the following falling edge of clock signal 166, PDC_UP and PDC_DN respectively preset DCs 130, 131, which start counting up from these initials values at the clock signal 166 frequency. A0D 140, 141 monitor the counters' output lines and signal all zero states reached to DFFs 152, 153 where these all zero flags are latched for one complete period of the clock signal 166 to respectively produce divided down variants of the clock signal 166, namely DP_UP and DP_DN. For a clock signal 166 having a frequency fL and density dividing codes of PDC_UP and PDC_DN=PDC_UP−1, the density of respective signals DP_UP and DP_DN is shown to be given by (fL)/PDC_UP and fL/(PDC_UP−1). In this particular embodiment, PDC_UP and PDC_DN are 7 bits wide and can provide a pulse density adjustment ranging from 1 to $1/128$. If required, the DP_UP and DP_DN can also be generated by the respective DFF 152, 153 to be continuously "high" by loading 0s in the associated DDR 120, 121, or continuously "low" by appropriately setting the Z bit of the associated DDR 120, 121 such that the inverted Q output of the respective DFF 201, 202 is maintained in a low state for keeping the input of the respective DFF 152, 153 low. When the DP_UP and DP_DN are not generated in a "high" or a "low" state, they carry the phase error information by means of their differing pulse density. This pulse density difference is preferably kept small for improving the resolution of the analog control voltages supplied to the VCXO 22. This is further explained below in connection to the theory of operation of the DCDCI circuit 1.

In a digital or analog acquisition mode of operation where the microsynchronizer seeks to attain a frequency loop equal to the reference frequency of interest, the DCDCG 31 initially receives programmed density dividing codes stored in the CU 9 which are subsequently replaced by phase error information collected in the DPDs 3, 5 or the APD 7 of FIG. 2. As noted before, this accelerates the DPLL acquisition process for low frequency signals and the APLL acquisition process for high frequency signals, depending on which frequency loop is operational. To achieve the fastest DPLL or APLL acquisition process, the duty cycle difference between the UPP/UPN and DNP/DNN signals or the duty cycle of the AUP/ADN signals (depending on which of the first or second set of differential ECL signals is received by the AC-DC converter 25) must be large for supplying the VCXO 22 with high analog control voltages such that the frequency of the locally generated clock signal sL can be quickly adjusted to be in synchronism with the above-mentioned reference frequency of interest. Accordingly, in these modes of operation, the DCDCG 31 functions to produce DP_UP and DP_DN with a large duty cycle difference by dividing down the pulse density of the clock signal 166.

The clock signal 166 is preferably selected by the clock selector 169 to have a sufficient resolution for achieving fast acquisition of the DPLL or the APLL lock state. For example, the preferred embodiment of FIG. 3 shows the high frequency MxfL clock signal and the low frequency fL clock signal coupled to the clock selector 169. The PDD circuit 123 receives the clock signal with the lower frequency fL during the digital and analog acquisition modes of operation as this clock signal has a resolution which is adequate for fast acquisition operations.

The DP_UP and DP_DN signals generated by the PDD 123 are fed to the PWE units 160, 161 which provide means for finely adjusting their respective pulse width according to the width extension codes received from the CU 9 for producing the WDP_UP and WDP_DN signals. These signals are supplied to the PED 32 of FIG. 2 where the differential ECL signals UPP/UPN, DNP/DNN and AUP/ADN are generated and supplied to the AC-DC converter 25. The WDP_UP and WDP_DN signals are derived to provide a better resolution of the phase error information and are respectively generated with the same pulse density as that of DP_UP and DP_DN but with a duty cycle finely adjusted in accordance to width extension codes received via the DWC signal. As noted above, these codes are equally split in WEC_UP and WEC_DN and respectively applied to the PWE units 160, 161. The PWE units 160, 161 have an identical structure and mode of operation and as such, only the PWE unit 160 will now be further described with reference to FIG. 4.

The PWE unit 160 functions to extend the pulse width of the DP_UP signal according to the width extension codes WEC_UP for producing the WDP_UP signal. The PWE unit 160 has a PWER (pulse width extender register) 173 coupled to receive from the CU 9 the WEC_UP codes. The PWER 173 is also coupled to receive the DP_UP signal from the DCDCG 31 and supplies its output to a decoder unit 174 which produces a plurality N of output signals generally indicated by 179, 180 and 181 (only three shown) which are respectively coupled to a plurality N of DE (delay elements) 175, 176 and 177 (only three shown). The DEs 175, 176, 177 are connected in series to form a DE chain. Each DE 175, 176, 177 is respectively coupled to receive the DP_UP signal from the PDD unit 123 of FIG. 3. The last DE 177 forming the DE chain is coupled to the ground while the output of the first DE 175 is coupled to an OR gate 178 together with the DP_UP signal to produce the WDP_UP signal.

In operation, the PWE unit 160 receives the WEC_UP codes from the CU 9 and extends the pulse width of the DP_UP signal by a corresponding amount using a selectable number of DEs 175, 176 and 177. More particularly, the WEC_UP codes are loaded into the PWER 173 on the occurrence of the DP_UP signal's leading edge. The WEC_UP codes are then immediately transferred to the decoder unit 174 which operates to extract information on the number of DEs 175, 176 and 177 to be inserted in the DP_UP signal path and accordingly enables the corresponding number of DEs 175, 176, 177 via its output signals 179, 180, 181 to form the operational DE section. The DEs 175, 176, 177 are enabled in sequence such that if there are less DEs 175, 176, 177 to be enabled than the number available in the chain, the decoder unit 174 enables the DEs 175, 176, 177 in sequence starting from the one closest to the OR gate 178. For example, if two DEs are to be inserted in the DP_UP signal path, only DEs 175 and 176 are enabled.

In function, the DP_UP signal is continuously supplied to all DEs 175, 176, 177. However, only the last DE of the operational DE section accepts the DP_UP signal to extend its pulse width by an amount equivalent to the DE propagation delay. The DP_UP signal having the extended pulse width is then processed through the remaining portion of the enabled DE section where the DP_UP pulse width is further extended in each DE 175, 176, 177 by an amount also equivalent to the respective propagation delay of each DE 175, 176, 177. The resulting signal WDP_UP is obtained by ORing the unaltered DP_UP signal and the delayed version of the DP_UP signal in the OR gate 178. WDP_UP has a duty cycle which is defined by the duty cycle of the DP_UP signal and the sum of the delays respectively introduced by the DEs 175, 176, 177 forming the operational DE section. A preferred embodiment of the PWE unit 160 has 64 DEs 175, 176, 177 each with a maximum propagation delay of 0.28 nS. The duty cycle of WDP_UP can therefore be extended from 1*0.28 nS=0.28 nS to 64*0.28 nS=17.92 nS.

In the digital locked mode of operation, the PDD circuit 123 and PWE units 160, 161 of the DCDCG of FIG. 3 combine to provide high resolution of the analog control voltages supplied to the VCXO 22. In particular, the frequency gap between the locally generated signal sL and the reference signal sR1 is comparatively smaller than that observed during the digital acquisition mode of operation and as such, the microsynchronizer takes advantage of its narrower DPLL loop bandwidth to provide better resolution and accuracy of the sL signal characteristics. This better resolution and accuracy is effected in the DCDCG 31 by selecting the clock signal 166 to have a high frequency, reducing the frequency of the clock signal 166 according to the density divider codes received from the CU 9 via the DWC signal for producing the DP_UP and DP_DN signals and finely adjusting the pulse width of DP_UP and DP_DN according to the width extension codes also received from the CU 9 via the DWC signal. Accordingly, the PDD circuit 123 receives the high frequency MxfL clock signal during the digital locked mode of operation for producing the DP_UP and DP_DN output signals with a lower duty cycle. DP_UP and DP_DN are further processed in the PWE units 160, 161 to obtain the WDP_UP and WDP_DN output signals. These signals are then fed to the PED 32 of FIG. 3 for generating and supplying the first set of differential ECL signals UPP/UPN, DNP/DNN to the AC-DC converter 25 of FIG. 2.

FIG. 5 illustrates how the functionality of the PDD circuit 123 and the PWE units 160, 161 combine during the digital locked mode of operation to provide high resolution in the digital control of the WDP_UP and WDP_DN duty cycle. More specifically, trace examples of the MxfL clock signal as it is supplied to the PDD 123 of FIG. 3 and corresponding DP_UP, DP_DN output signals are shown to illustrate how the PDD 123 adjusts the pulse density of its output signals by respectively dividing down the MxfL clock signal with density dividing codes. FIG. 5 also shows the corresponding output signals WDP_UP, WDP_DN of the PWE units 160, 161 which are respectively derived from DP_UP and DP_DN to illustrate how the PWE units 160, 161 operate to extend the pulse width of DP_UP and DP_DN according to width extension codes.

In the analog locked mode of operation, the DCDCG 31 and more particularly the PDD 123 provides gain adjustment for the AUP/ADN differential ECL. In particular, the DWC signal is used by the CU 9 to adjust the pulse density of the AUP/ADN differential ECL signals by dividing down the clock signal 166 in the same manner as that described above in relation with the digital locked mode of operation for producing the DP_UP and DP_DN signals. As in the digital or analog acquisition modes of operation, these signals are obtained from dividing down the fL clock signal 166 which is selected by the CU 9 of FIG. 2 via the EXT and ACQ signals and produced by the clock selector 169. The clock signal 166 and DP_UP are fed to the PED 32 to be combined with the PWM signal received from the APD 7 of FIG. 2 for generating and supplying the second set of differential ECL signals AUP/ADN to the AC-DC converter 25 of FIG. 2. As a result PWEs 160, 161 are not used during APLL operations. It is to be noted that the gain adjustment described above may also be used in connection with the first set of differential signals UPP/UPN, DNP/DNN for a situation where these signals would be used during the analog locked mode of operation for generating the analog control voltages. This scenario is further explained below in reference with FIG. 8.

Turning now to FIG. 6, the PED 32 of the PEG unit 11 functions to regulate and selectively combine the streams of data received from the DCDCG 31 via the clock signal 166, the DP_UP, WDP_UP and WDP_DN output signals and from the APD 7 of FIG. 2 via the PWM analog signal onto the first and second set of differential ECL signals UPP/UPN, DNP/DNN and AUP/ADN according to the microsynchronizer's mode of operation as signaled by the control signals EXT and ACQ. More specifically, the DP_UP signal is supplied to the inverting input of an AND gate 182 while the non-inverting input is connected to receive the clock signal 166. The PED 32 has another AND gate 183 which receives the DP_UP signal together with the PWM signal. The AND gates 182, 183 are coupled to an OR gate 205 for producing an analog signal ANA_UP. The PED 32 further has a array of logic gates generally indicated by 171 which has three OR gates 184, 185 and 186 externally connected to the AC-DC converter 25 for respectively supplying the UPP/UPN, DNP/DNN and AUP/ADN differential ECL output signals. Each OR gate 184, 185, 186 is respectively coupled to receive the output of one two-input AND gate 187, 188 and 189 (hereinafter, AND gates 187, 188 and 189) and two three-input AND gates 190, 191, 192, 193 and 194, 195 (hereinafter, AND gates 190, 191, 192, 193 and 194, 195). The AND gates 187, 188, 189, 190, 191 have non-inverting inputs while the AND gates 192, 193 and 194, 195 have one inverting input and two non-inverting inputs. The array of logic gates 171 has AND gates 189, 191 coupled to the OR gate 205 to receive the ANA_UP signal via a non-inverting input and also has the AND gate 193 coupled to receives it via an inverting input. The array of logic gates 171 is externally coupled to the DCDCG 31 to receive the WDP_UP and WDP_DN output signals. In particular, WDP_UP is supplied to the non-inverting inputs of respective AND gates 187, 190, 194 and to the inverting input of the AND gate 195. WDP_DN is respectively supplied to a non-inverting input of AND gate 188 and to the inverting inputs of respective AND gates 192, 194 and to a non-inverting input of the AND gate 195.

The array of logic gates 171 is also connected to receive a series of control signals. In particular, the ACQ signal is supplied to the AND gates 190, 192, 194 and 195 via a non-inverting input. A buffered signal DCI_ACQEXTDISN which is either pulled high or pulled low is received in non-inverting inputs of respective AND gates 190, 191, 192 and 193. The outputs signals of a DPLL/APLL mode selector 170 labeled DPLL_ON and APLL_ON are respectively supplied to AND gates 187, 188 and AND gates 191, 193 and 189 via non-inverting inputs. The DPLL/APLL mode selector 170 has a two-input OR gate 198 and a pair of two-input AND gates 199, 200 where AND gate 199 has inverting inputs and AND gate 200 has one inverting input and one non-inverting input. The DPLL/APLL mode selector 170 is coupled to receive the EXT and ACQ control signals from the CU 9 in the OR gate 198, AND gate 199 and in the AND gate 200 where EXT is supplied to the non-inverting input and ACQ applied to the inverting input. The OR gate 198, AND gate 199 and 200 respectively produce the signal SW for the digital switch 17 of FIG. 2 and the signals DPLL_ON and APLL_ON to the array of logic gates 171.

In operation, the PED 32 receives the DP_UP, WDP_UP, WDP_DN signals from the DCDCG 31 and the PWM signal from the APD 7 for selectively producing the first and second set of differential ECL signals UPP/UPN, DNP/DNN and AUP/ADN based on the state of the DCI_ACQEXTDISN signal and the operational mode of the microsynchronizer of FIG. 2 as flagged by the control signals EXT, ACQ received from the CU 9.

In the digital and analog acquisition modes of operation, the ACQ signal is always enabled and for the embodiment shown in FIG. 2, the DCI_ACQEXTDISN signal is grounded which enables the exclusive generation of the AUP/ADN differential ECL signals. More particularly, the control signals EXT and ACQ received from the CU 9 are applied to the DPLL/APLL mode selector 170 for disabling the SW, DPLL_ON and APLL_ON signals. In these modes of operation, the WDP_UP and WDP_DN signals are ANDed in AND gates 194, 195 together with the ACQ signal. The results of these AND operations are ORed in the OR gate 186 to produce the AUP/ADN differential ECL signals. The WDP_UP and WDP_DN are also respectively supplied to AND gates 187, 190 and 188, 192 but when the DCI_ACQEXTDISN signal is pulled low, the AUP/ADN are generated free of interference from UPP/UPN, DNP/DNN as these signals are inhibited in the PED 32 by firstly ANDing WDP_UP and WDP_DN in respective AND gates 187 and 188 with disabled DPLL_ON. Secondly, WDP_UP and WDP_DN are also ANDed in AND gates 190 and 192 with the DCI_ACQEXTDISN signal pulled low. However, for another embodiment which will be described below in reference to FIGS. 8 and 9, the DCI_ACQEXTDISN signal is pulled high and the UPP/UPN, DNP/DNN signals are also generated but in this scenario, the AUP/ADN output signals are disactivated and left unconnected (this will be further described below with reference to FIG. 8) and therefore UPP/UPN, DNP/DNN are generated free of interference.

In a digital locked mode of operation, the PED 32 functions to produce the UPP/UPN, DNP/DNN differential ECL signals exclusively from the WDP_UP and WDP_DN signals. More particularly, the EXT, ACQ control signals are applied to the DPLL/APLL mode selector 170 for enabling SW, DPLL_ON and disabling APLL_ON to reflect the DPLL state of operation of the microsynchronizer. Accordingly, the UPP/UPN and DNP/DNN signals are exclusively generated from the WDP_UP and WDP_DN signals. UPP/UPN are obtained from the OR gate 184 by ANDing WDP_UP with enabled DPLL_ON in the AND gate 187. In a similar manner, the DNP/DNN are obtained from the OR gate 185 by ANDing WDP_DN with DPLL_ON in the AND gate 188. The UPP/UPN, DNP/DNN are also generated free of interference from AUP/ADN during this particular mode of operation as the OR gate 186 inputs are inhibited by the combined operation of the disabled APLL_ON and ACQ control signals.

In the analog locked mode of operation, the PED 32 receives the DP_UP and the clock signal 166 from the DCDCG 31 and the PWM signal from the APD 7 for selectively generating the UPP/UPN, DNP/DNN or the AUP/ADN differential ECL signals according to the state of the DCI_ACQEXTDISN signal. This mode of operation is effected by the control signals EXT, ACQ which are applied to the DPLL/APLL mode selector 170 for enabling APLL_ON and disabling SW and DPLL_ON to reflect the APLL state of operation of the microsynchronizer. When the DCI_ACQEXTDISN signal is pulled low, the PED 32 only operates to produce the AUP/ADN differential ECL signals free of interference from the UPP/UPN, DNP/DNN as these signals are inhibited in the manner described above in relation to the PED 32 digital and analog acquisition modes of operation. In this scenario, AUP/ADN are generated from PWM but with a gain which can be adjusted from 1 to 1/128 whenever necessary by the combined operation of DP_UP and the clock signal 166. In particular, when the DP_UP signal is high, the PWM signal is directly routed to the OR gate 186 for producing the AUP/ADN signals. When the DP_UP signal is low, the AUP/ADN signals are generated from the clock signal 166 instead. AUP/ADN are exclusively generated with the PWM signal, DP_UP and the clock signal 166 since the state of the ACQ signal precludes WDP_UP and WDP_DN from getting through to the OR gate 186. However, when the DCI_ACQEXTDISN signal is pulled high, the UPP/UPN, DNP/DNN are also generated but similarly to the acquisition operations of the PED 32, the AUP/ADN output signals are left inactive and unconnected (further details below in reference to FIG. 8) and therefore UPP/UPN, DNP/DNN are generated free of interference. In this situation, the UPP/UPN and DNP/DNN signals are respectively obtained by combining DP_UP with PWM in the AND gate 183 and combining the inverted DP_UP with the clock signal 166 in the AND gate 182. The resulting ANA_UP signal is fed through to the OR gates 184, 185 via the AND gates 191, 193 where they are respectively ANDed with APLL_ON and DCI_ACQEXTDISN. The UPP/UPN, DNP/DNN are generated exclusively from DP_UP, the clock signal 166 and PWM as WDP_UP and WDP_DN are respectively prevented from getting through in the AND gates 187, 190 and 188, 192 by the combined operation of the disabled DPLL_ON and ACQ control signals.

The following section will now describe the AC-DC converter 25 in its various modes of operations with reference to FIG. 7.

The AC-DC converter 25 functions to selectively transform the differential ECL signals UPP/UPN, DNP/DNN or AUP/ADN received from the PED 32 into high resolution analog control voltages for use by the VCXO 22. In the digital or analog acquisition mode of operation, the AC-DC converter 25 generates high gain analog control voltages to the VCXO 22 so as to achieve fast lock acquisition of the frequency loop of interest. Similarly, the AC-DC converter 25 produces high gain analog control voltages to the VCXO 22 when operating in the analog locked mode of operation to accommodate fast frequency transients of the high frequency reference signal sR3. When functioning in a digital locked mode of operation, the AC-DC converter 25 achieves better resolution and accuracy of the sL signal characteristics in relation to sR1 by providing the VCXO 22 with high resolution analog control voltages.

As noted before, the AC-DC converter 25 is coupled to receive the UPP/UPN and DNP/DNN differential ECL signals with the digital error attenuator generally indicated by 13 and is also coupled to receive the AUP/ADN differential ECL signals with the analog error amplifier generally indicated by 15. More specifically, the digital error attenuator 13 has a pair of LPFs generally indicated by 70 and 71 which are respectively coupled to receive UPN, DNP and UPP, DNN. Each LPF 70, 71 has a pair of resistors R1, R2 and R3, R4 commonly connected at one end to a respective capacitor C1, C2 which has its other terminal connected to the ground. Resistors R1 and R2 are respectively coupled to receive UPN and DNP while UPP and DNN are received by resistors R3 and R4. The LPFs 70, 71 are externally connected to respective resistors R5, R6 which are, in turn, connected to respective negative and positive inputs of an operational amplifier A1. The negative input is also coupled to the operational amplifier A1 output with resistor R7 while the positive input is coupled to ground with resistor R9. The operational amplifier A1 has its output connected to the digital switch 17 through a resistor R8.

The AC-DC converter 25 has the analog error amplifier 15 coupled to receive the AUP/ADN differential ECL signals in respective LPFs 72, 73. Each LPF 72, 73 has a resistor R10 and R11 which are respectively coupled to receive AUP and ADN and each connected to a capacitor C3, C4 which has its other terminal coupled to the ground. The LPFs 72, 73 are respectively coupled to the negative and positive input of another operational amplifier A2 through a corresponding resistor R12, R13. The negative input is also coupled to the operational amplifier A2 output with resistor R27 while the positive input is coupled to ground with resistor R15. The operational amplifier A2 has its output connected to the digital switch 17 through a resistor R14. The digital switch 17 is also coupled to receive the SW control signal from the PED unit 11 of FIG. 2. The AC-DC converter 25 further has the digital switch 17 connected to the negative input of the integrator generally indicated by 19. The integrator 19 has a resistor R16 externally connected to the digital switch 17 and internally coupled to the negative input of an operational amplifier A3. The negative input is also coupled to the operational amplifier A3 output through a capacitor C4 and a resistor R17 connected in series while the positive input is coupled to ground through a resistor R18. The integrator 19 output is coupled to the ripple filter generally indicated by 21. The ripple filter has a resistor R19 externally coupled between the integrator 19 output and the VCXO 22 and internally coupled to the ground through a capacitor C5.

In a digital or analog acquisition mode of operation where the microsynchronizer seeks to attain a frequency loop equal to the reference frequency of interest, the AC-DC converter 25 functions to receive the AUP/ADN signals generated with a large duty cycle by the PED 31 and convert them into analog control voltages for use by the VCXO 22 such that the frequency of the locally generated clock signal sL can be quickly adjusted to be in synchronism with the reference frequency of interest. As noted before, this accelerates the DPLL acquisition process for low frequency signals and the APLL acquisition process for high frequency signals, depending on which frequency loop is operational. In particular, the AUP and ADN signals are applied to the analog error amplifier 15 where they are respectively low pass filtered in LPFs 72, 73. Each LPF 72, 73 is designed with a cut-off frequency of 10 KHz. Accordingly, this particular embodiment of the invention has R10=R11=5 KΩ while C3=C4=3.3 nF. The operational amplifier A2 receives AUP in its negative input and therefore operates to add AUP to ADN. This addition amplifies the DC voltage component present in the AUP and ADN signals which, once integrated (as explained below), results in larger analog control voltages increments applied to the input of the VCXO 22 and therefore substantially accelerates the DPLL or APLL state acquisition process. The sum is then further amplified in the operational amplifier A2 by an amount sufficient to compensate for the attenuation effected in the integrator 19 so as to yield a overall gain of approximately ⅔. In this embodiment, the operational amplifier A2 operates a gain of 10 with R12=5 KΩ, R13=5 KΩ, R15=100 KΩ and R27=100 MΩ. The amplified signal thus produced is selectively fed to the integrator 19 by the DPLL/APLL mode selector 170 of the PED 32 which generates the SW control signal to the digital switch 17 so as to connect the output of the operational amplifier A2 to the input of the integrator 19. The operational amplifier A2 output signal thus received in the integrator 19 is attenuated by a factor of 16 and band pass filtered with a microsynchronizer PLL bandwidth extending from 32 Hz to 2000 Hz. The desired attenuation and filter bandwidth is achieved with R17=5 KΩ, R14=39.2 KΩ, R16=39.2 KΩ, R18=5 KΩ and C4=8 μF. The integrator output signal is further low pass filtered in the ripple filter 21 with a cut-frequency of 50 KHz with R19=100 Ω and C5=33 nF to produce the analog control voltages for the VCXO.

In the digital locked mode of operation, the microsynchronizer provides a highly accurate digital phase locked loop or DPLL of the low frequency reference signal sR1. In this context, the AC-DC converter 25 operates a 100 Hz loop bandwidth which is narrower than that effected during any other mode of operation. This narrow bandwidth provides better resolution and accuracy of the sL signal characteristics in relation to sR1. Accordingly, the AC-DC converter 25 functions to convert the phase error information contained in the UPP/UPN and DNP/DNN differential ECL signals into high resolution analog control voltages for the VCXO 22.

More particularly, the differential ECL signals UPP/UPN and DNP/DNN are generated by the PED 32 and applied to the input of the AC-DC converter 25 to be converted into high resolution control voltages. In particular, the UPP/UPN and DNP/DNN signals are supplied to the digital error attenuator 13 where UPN and DNP are criss-crossed to form two new pairs of signals, namely UPP/DNP and DNN/UPN. The LPF 70 operates to add UPN with DNP in LPF 70 and also operates to low pass filter the sum with a cut-off frequency preferably set to 100 Hz for producing a composite signal UPP-DNP. Similarly, DNN is added to UPP and the sum is low pass filtered with a 100 Hz in LPF 71 to produce a composite signal DNN-UPN. In this particular embodiment, a cut-off frequency of 100 Hz is achieved with R1=R2=R3=R4=91 KΩ while C1=C2=18 nF. This initial addition and filtering of the UPN/DNP and UPP/DNN pairs procures maximum attenuation of the undesired AC voltage component otherwise present in the resulting UPN-DNP and DNN-UPP composite signals applied to the respective inputs of the operational amplifier A1 where the difference between these two composite signals is measured and attenuated. Resistors R5, R6, R7 and R9 are accordingly selected to provide a gain which is less than one so as to improve the digital-to-analog conversion resolution of the control voltage step presented to the VCXO 22. In this particular embodiment, R5=R6=30 KΩ, R7=R9=10 KΩ to attenuate the difference measured across the operational amplifier A1 input terminals by a factor of 12. The output signal generated by the amplifier A1 is further attenuated with R8=39.2 KΩ before being selectively routed by the PED 32 of FIG. 6 to the integrator 19 with the digital switch 17 via the SW control signal. The integrator 19 further attenuates and integrates the incoming signal in a manner identical to that described above in relation to the digital or analog acquisition of operation so as to produce high resolution analog control voltages for the VCXO 22.

In the analog locked mode of operation where the microsynchronizer functions to provide an analog phase locked loop or APLL of the high frequency reference signal sR3, the ECL differential signals AUP and ADN are applied and processed by the AC-DC converter 25 in a manner identical to that described above in relation to its operation in the digital and analog acquisition modes. Accordingly, the AC-DC converter 25 operates to convert phase error information received via the AUD and ADN differential signals into large analog control voltages with a gain of approximately one so as to accommodate fast frequency transients present in sR3.

Figure 8:
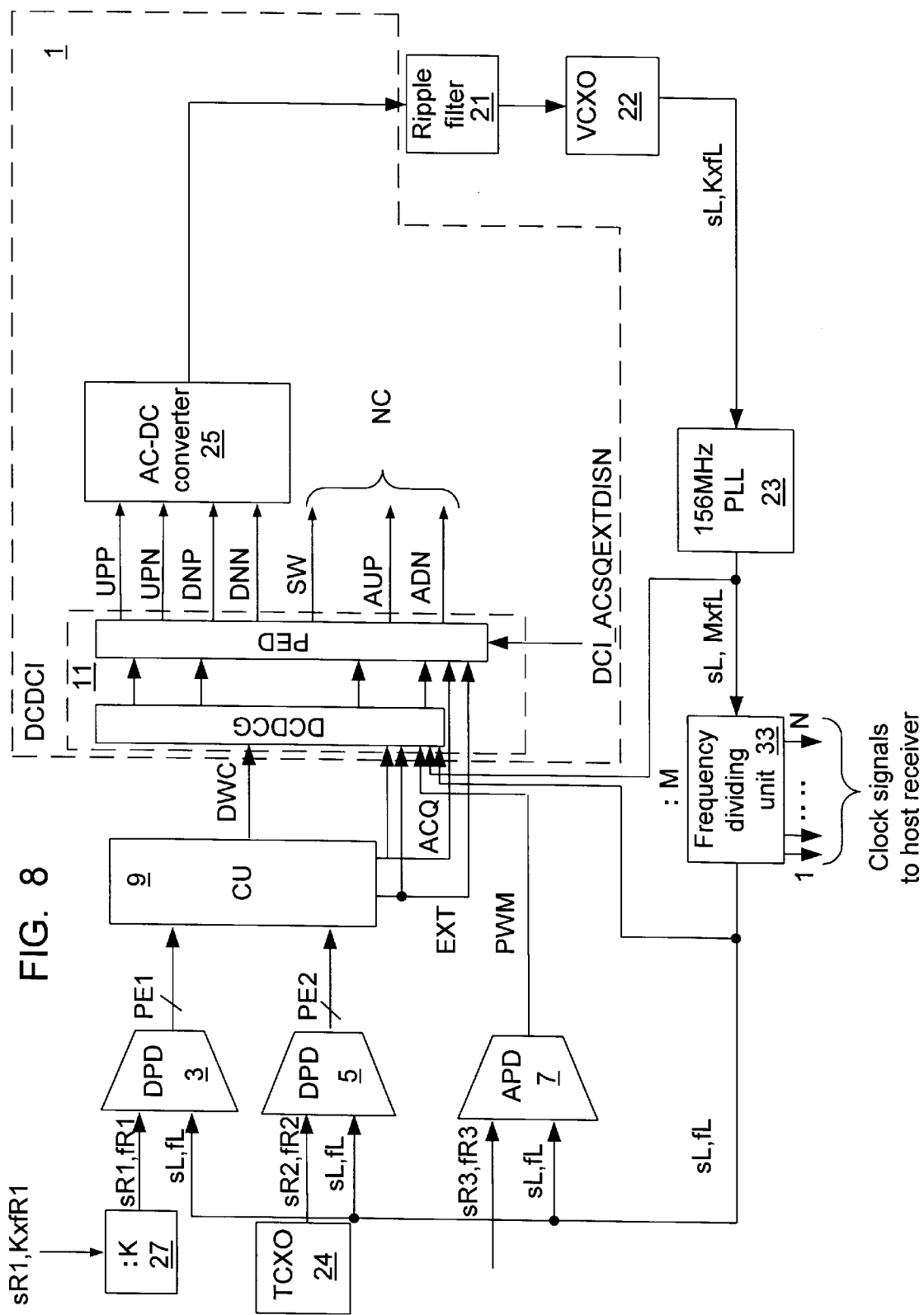
FIG. 8 is a block diagram of the microsynchronizer incorporating the DCDCI circuit according to another embodiment of the invention.

FIG. 8 shows another embodiment of the DCDCI circuit 1 incorporated in the microsynchronizer where the digital switch 17 has been eliminated and the digital error attenuator 13, analog error amplifier 15 and integrator 19 have been combined into a simpler AC-DC converter 25 which will now be further described below with reference to FIG. 9. To begin however, it is important to note that in this embodiment, only the UPP/DNP, UPN/DNN differential ECL signals are used for both digital and analog operations and consequently, the AUD/ADN differential ECL signals are left unconnected. It is also important to note that functionality of the microsynchronizer in its various modes of operations remains unchanged. However, when operating in the digital and analog acquisition modes of operation and in the analog locked mode of operation, the PED 32 of the PEG unit 11 no longer uses its AUP/ADN differential ECL signals but rather operates in these modes by utilizing UPP/UPN, DNN/DNP to convey the phase error information it generates to the AC-DC converter 25. Evidently, the operation of the PEG unit 11 in a digital locked mode remains unchanged as the UPP/UPN, DNN/DNP differential ECL signals are still used. These signals are processed through the AC-DC converter 25 to the VCXO 22 in a manner similar to that described above in relation to the description of the digital locked mode of operation of the DCDCI circuit 1 of FIG. 2.

Figure 9:
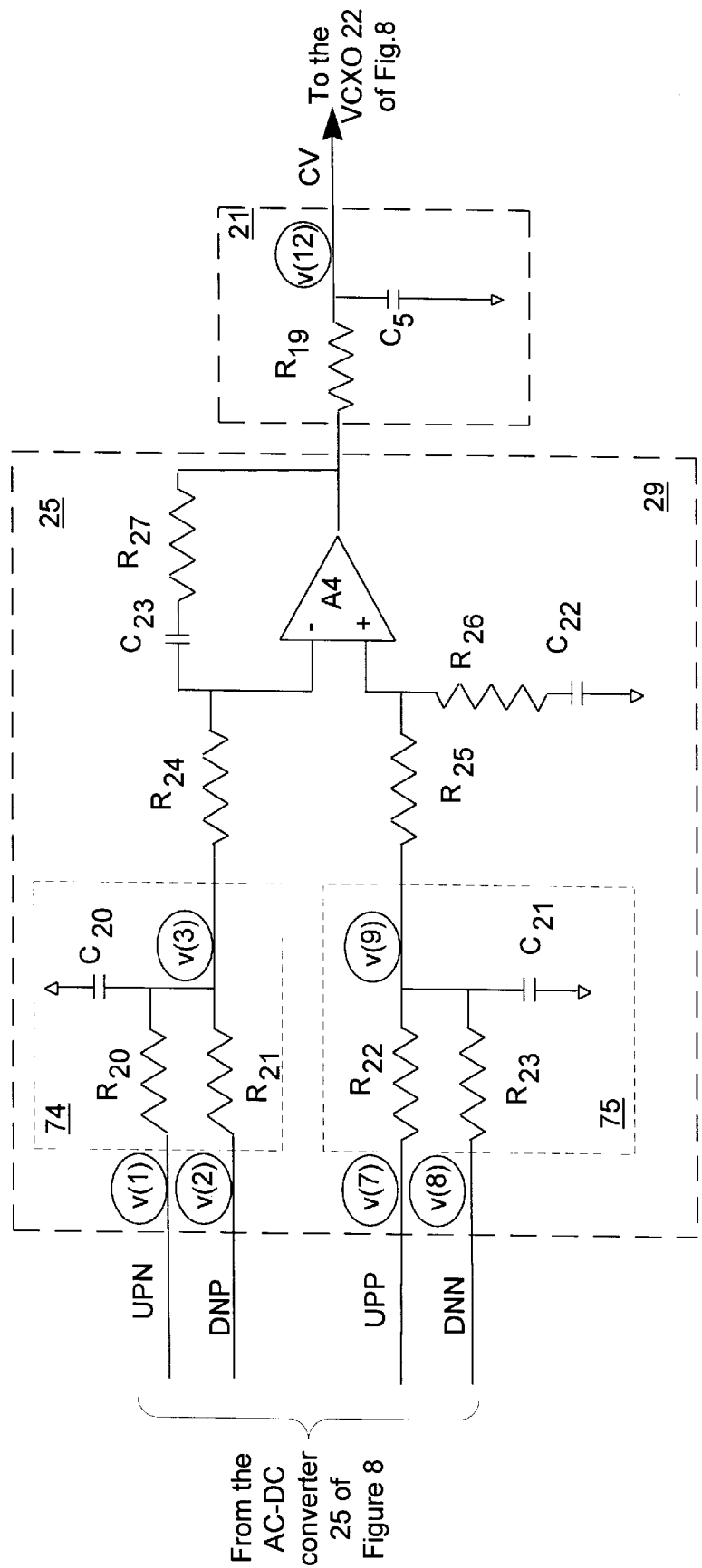
FIG. 9 is a block diagram of the AC-DC (alternating current-direct current) converter for the DCDCI circuit of FIG. 8.

Turning now to FIG. 9, the digital error attenuator 13, analog error amplifier 15 and integrator 19 of FIG. 7 have all been combined into the AC-DC converter generally shown by 25. More particularly, the AC-DC converter 25 of this embodiment is coupled to receive the UPN, DNP and UPP, DNN differential ECL signals with a respective LPF 74, 75. The LPFs 74, 75 have a identical structure identical to that of LPFs 70, 71 described above in reference to FIG. 7 with the exception that their respective components R20, R21, C20 and R22, R23 and C21 are selected to effect a 10 KHz cut-off frequency. Accordingly, R20=R21=R22=R23=10 KΩ and C20=C21=1.8 nF. LPFs 74, 75 are respectively connected to the negative and positive inputs of an operational amplifier A4 through a corresponding 3.3 KΩ resistor R24, R25. The negative input is also coupled to the operational amplifier A4 output through a resistor R27 and a capacitor C23 connected in series while the positive input is coupled to the ground with resistor R26 and capacitor C22 also connected in series. The AC-DC converter 25 is coupled to the ripple filter 21 which is connected to the VCXO 22 in the same manner as that described above in reference to FIG. 7.

In all four modes of operation, the PED 32 of FIG. 8 uses the DCI_ACQEXTDISN signal (which is pulled high for this embodiment) to drive the UPN/DNP, UPP/DNN differential ECL signals which are applied to the AC-DC converter 25 and more specifically to LPFs 74, 75 in a manner identical to that described above with reference to FIG. 7 to obtain the analog control voltages for the VCXO 22. The UPP/DNN, UPN/DNP differential ECL signals are processed through the LPFs 74, 75 and operational amplifier A4 in virtually the same way as that described in relation with the LPFs 70, 71, operational amplifier A1 and integrator 19 illustrated in FIG. 7. One slight modification in the UPP/DNN path must however be noted. The capacitor C22 has been added to integrate the composite UPP-DNN signal in a manner identical to that performed on the UPN-DNP composite signal. As a common path is used for both digital and analog operations, the LPFs 74, 75 each have a 10 KHz cut-off frequency while the operational amplifier A4 which functions as a differential integrator by the combined operation of resistors R24, R25, R26, R27 and capacitors C23, C24 to provide the microsynchronizer with a (32 Hz–2 Khz) PLL bandwidth and a gain of ⅔. The output of the AC-DC converter 25 is applied to 50 Khz filter 64 in the known way before being presented to the input of VCXO 22.

As it can be seen from the above, the functionality of the AC-DC converter 25 of FIG. 9 is generally similar to that of the embodiment of FIG. 7 described above for the digital locked mode of operation as consisting of converting the UPN/DNP, UPP/DNN differential ECL signals into high resolution analog control voltages for the VCXO 22. This high resolution conversion is further described below with FIGS. 10, 11 and 12 but only in relation to the AC-DC converter 25 embodiment shown in FIG. 9.

Figure 10:
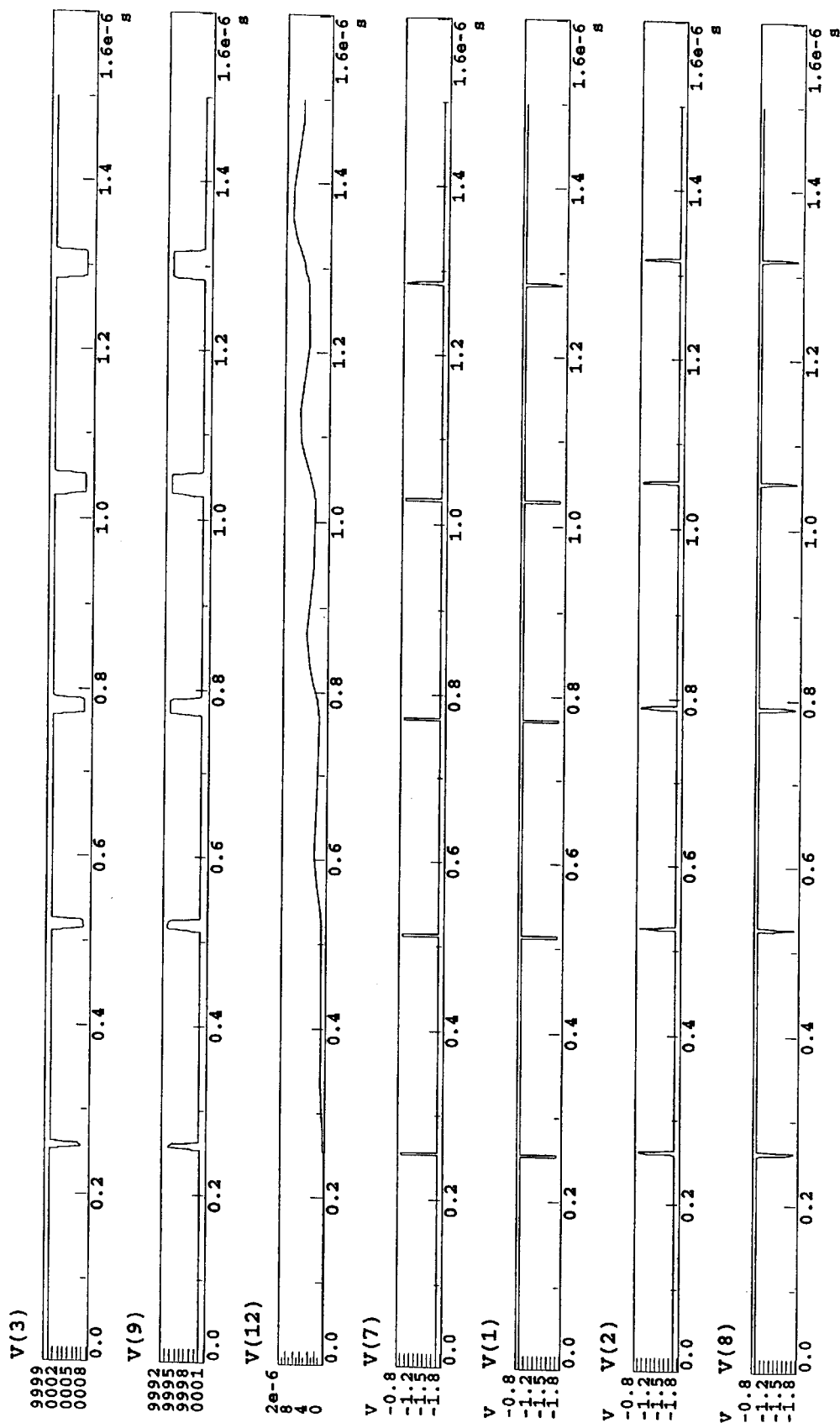
FIG. 10 shows magnified voltage/time plots of signals measured at various points in the AC-DC converter illustrated in FIG. 9 and indicated as v(1), v(2), v(7), v(8), v(3), v(9) and v(12) for a very large difference between the duty cycle of signals UPP (up positive)/UPN (up negative) and DNP (down positive)/DNN (down negative)
Figure 11:
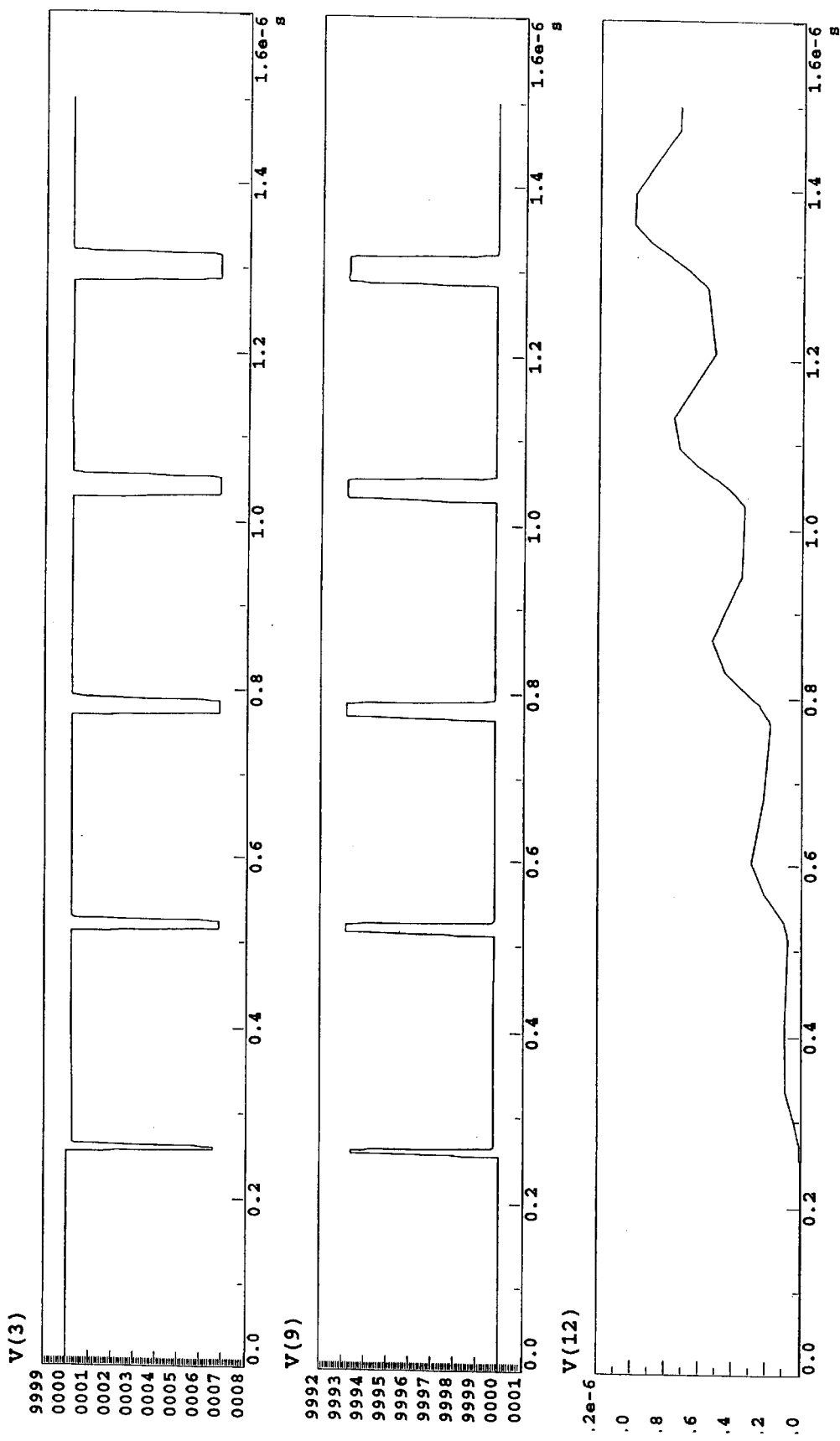
FIG. 11 shows magnified representations of v(3), v(9) and v(12) of FIG. 10.

Referring firstly to FIG. 10, time diagram representations of the voltage signals measured at various points in the AC-DC converter 25 of FIG. 9 are shown and respectively denoted by v(1), v(2), v(7), v(8), v(3), v(9) and v(12). In particular, the UPP/DNN, UPN/DNP differential ECL signals are respectively illustrated by v(1), v(2), v(7) and v(8) time diagrams as they are applied to the input of the AC-DC converter 25 of FIG. 9. FIG. 10 also shows time diagram representations of the UPN-DNP and UPP-DNN composite signals respectively produced by the LPFs 74, 75 and applied to the inputs of the operational amplifier A4. These signals are respectively marked as v(3) and v(9) on FIG. 9. In can be observed that the duty cycle of v(3) and v(9) increases with the increasing frequency of UPP/UPN, DNP/DNN in relation to the frequency of DNP/DNN. FIG. 10 also shows the corresponding analog control voltage applied to the VCXO 22 of FIG. 8. This signal is illustrated on FIG. 9 as v(12). These time diagrams illustrate the case where the microsynchronizer is operating in a DPLL or APLL locked mode and where a target phase TP has not been attained yet. In this scenario, the phase error conveyed to the AC-DC converter 25 has been exaggerated to better illustrate the operation of the AC-DC converter 25 and correspondingly, the UPP/UPN signals generated by the PEG unit 11 of FIG. 2 have a duty cycle abnormally higher from that of the DNP/DNN signals. FIG. 11 shows a magnified version of v(3), v(9) to better illustrate how they are converted by the operational amplifier A4 to produce v(12).

Figure 12:
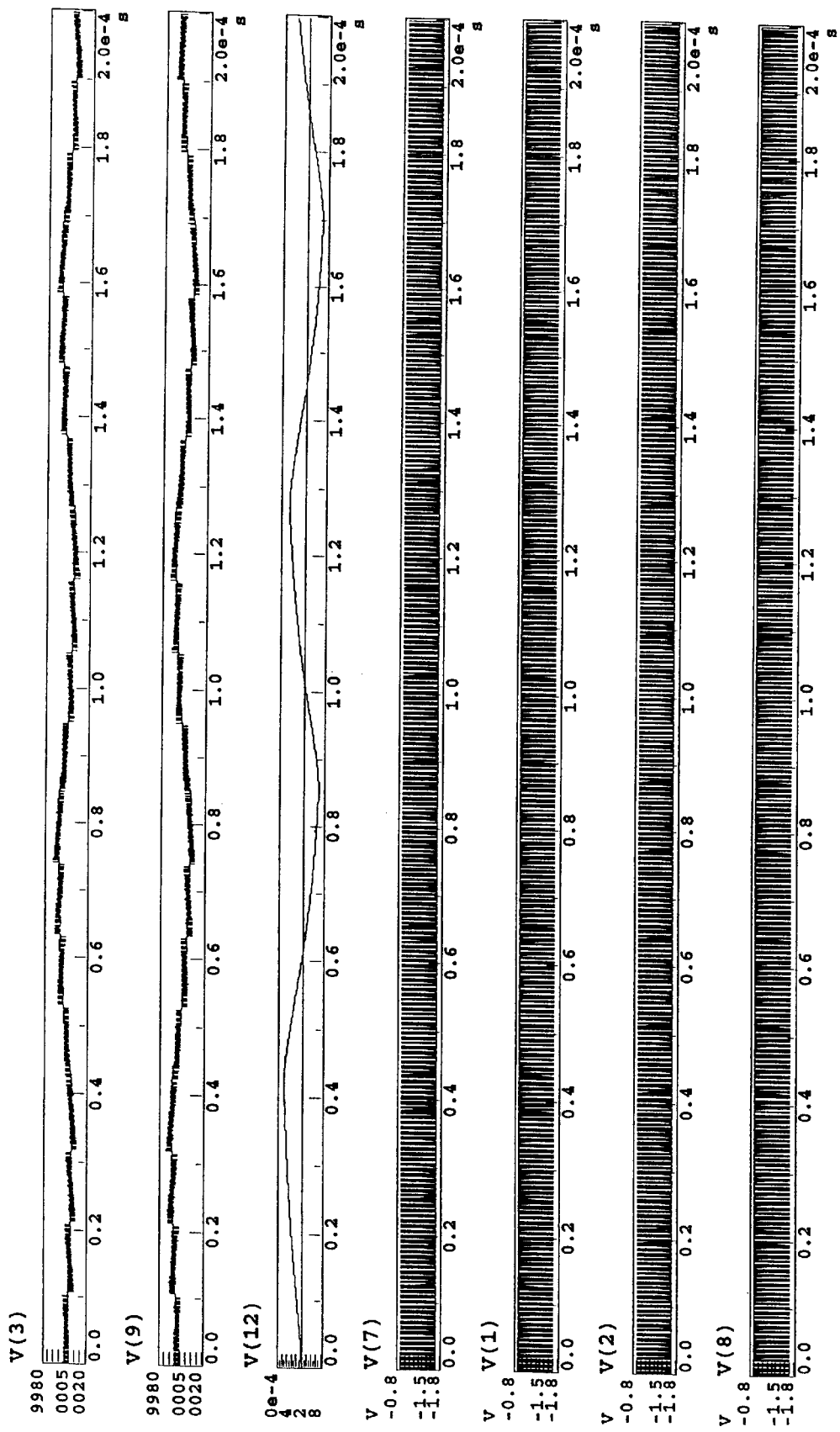
FIG. 12 shows representations of v(1), v(2), v(7), v(8), v(3), v(9) and v(12) for a duty cycle difference much smaller than that shown in FIG. 10.

A more realistic duty cycle difference between the UPP/DNN and UPN/DNP differential ECL signals is shown in FIG. 12 where the UPP/DNN, UPN/DNP signals are generated by the PEG unit 11 such that the control voltage applied to the VCXO 22 oscillates therefore causing the VCXO 22 output clock phase to oscillate around TP until new TP is calculated. It can be appreciated that the UPP/UPN, DNP/DNN signals are generated with their duty cycle cyclically adjusted so as to produce an oscillating analog control voltage to the VCXO 22.

The following section will now detail the theory of operation of the DCDCI circuit 1 of FIGS. 2 and 8 for generating high resolution analog control voltages to the VCXO 22 based on the UPP/DNN and UPN/DNP differential ECL signals received during DPLL operations of the microsynchronizer illustrated in FIG. 2 or during digital or analog operation of the microsynchronizer illustrated in FIG. 8.

Figure 4:
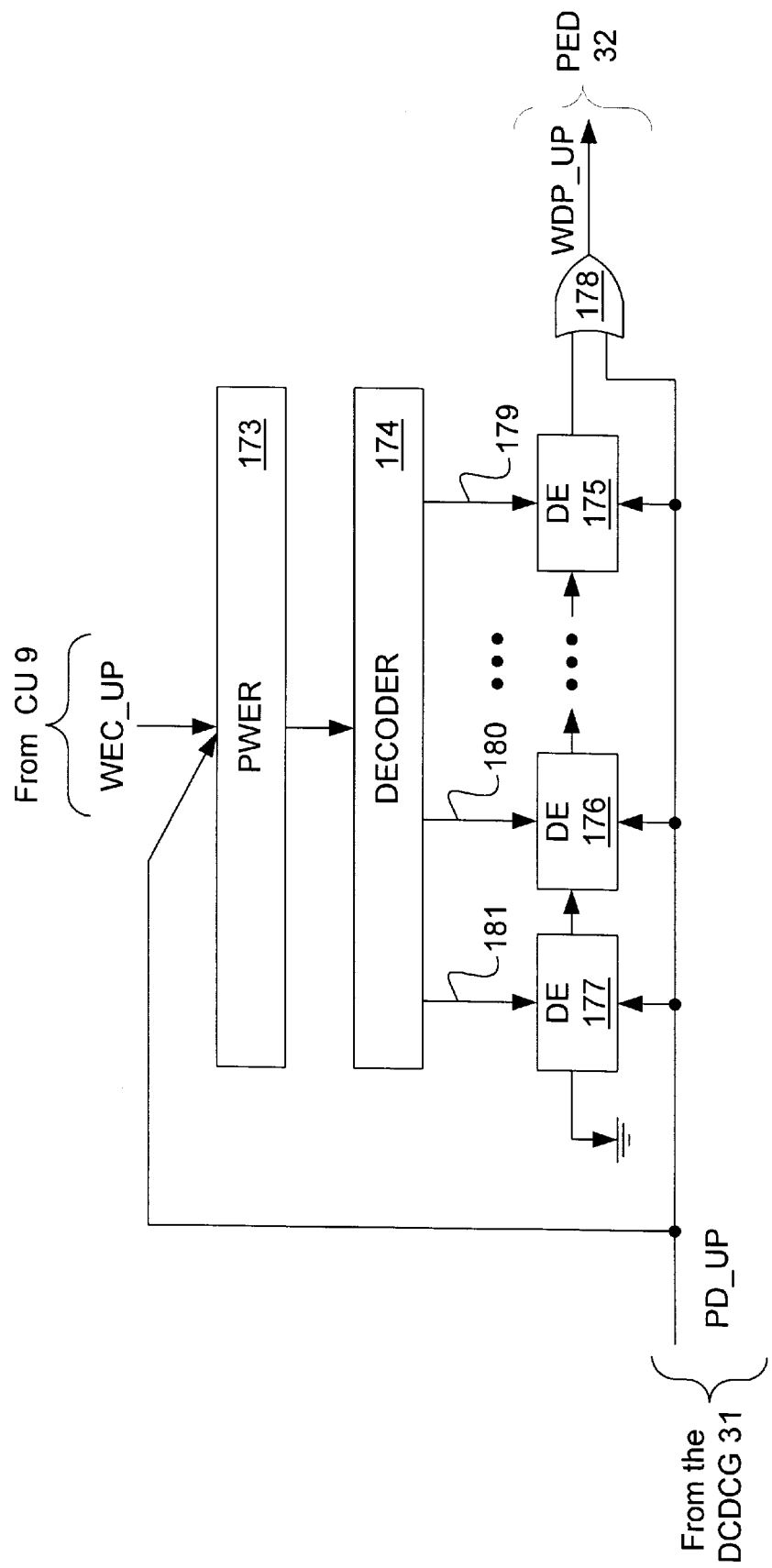
FIG. 4 is a block diagram of a PWE (pulse width extender) block used in the PEG unit of FIG. 2.

Taking into account both composite signals UPP-DNN and UPP-DNP, the step applied at the input of the differential integrator 63 is given by:

$$V_{DCOUT} = 2\Delta V_{ECL}\left[\frac{\frac{T_{DCCLK} + N_{ED}D_E}{T_{DCCLK}}}{PDC\_UP} - \frac{\frac{T_{DCCLK} + N_{ED}D_E}{T_{DCCLK}}}{PDC\_DN}\right]$$

where PDC_UP and PDC_DN are density divider codes supplied by the CU 9 of FIG. 2 to the PEG 11 also of FIG. 2, $T_{DCCLK}$ is the unextended pulse width of the UPP/DNN, UPP/DNP differential ECL signals, $D_E$ is a single delay value in PWEs 160, 161 delay chain illustrated in FIG. 4, $N_{ED}$ is the number of active delay elements used in the PWEs 160, 161 and $[(T_{DCCLK}+N_{ED}*D_E)/T_{DCCLK}]$ represents the effect of the pulse width extension on $V_{DCOUT}$ and effected in the PWEs 160 and 161.

As noted before, PDC_UP and PDC_DN are usually kept close to each other in order to achieve high resolution of the analog control voltage step applied to VCXO 22 of FIG. 2. Assuming (PDC_UP−1)≦PDC_DN≦(PDC_UP+1) and $D_R=D_E/T_{DCCLK}$, the above equation becomes:

$$V_{DCOUT} = \frac{\pm(2\Delta V_{ECL})}{PDC\_DN(PDC\_DN \pm 1)}(1 + N_{ED}D_R)$$

Based on the above, $V_{DCOUT}$ can be adjusted in the following ways. First, coarse tuning or pulse density adjustment is achieved by changing PDC_DN, while keeping $N_{ED}$ constant, maintaining PDC_UP related to PDC_DN in the above described manner and keeping PDC_DN below 64 to prevent any significant VCXO jitter. The resolution provided by coarse tuning is therefore limited to $(2\Delta V_{ECL}/4096)$.

The second tuning mode referred to as fine tuning by symmetrical adjustment is effected by adjusting the pulse width of both the DP_UP and DP_DN signals in the corresponding PWEs 160, 161 by the same amount of steps. In other words, $\Delta N_{ED}$ must be equal for both signals. Fine tuning resolution corresponds to a single step change and is limited to:

$$V_{DCOUT} = \frac{(\pm 2\Delta V_{ECL})D_R}{DDC\_DN(DDC\_DN \pm 1)} < \frac{\pm 2\Delta V_{ECL}}{2^{16}}$$

The resolution of the analog control voltage step achieved by following the above-described method can be further improved by setting the overall gain of the path taken by the UPP/DNN, UPP/DNP differential ECL signals to be less than 1. The preferred embodiment of the AC-DC converter 25 shown in FIG. 7 has an overall DPLL loop gain of ($\frac{1}{16} * \frac{1}{12}$) = $\frac{1}{192}$ which provides a resolution equivalent to that achievable with a 23 bit DAC (digital-to-analog converter). For the embodiment shown in FIG. 9, the overall DPLL loop gain is $\approx \frac{1}{3}$ which translates into a $\frac{1}{2}^{17}$ resolution.

FIGS. 2 and 8 show preferred embodiments of this invention which consists in a DCDCI circuit incorporated in a microsynchronizer capable of operating DPLL or and APLL configurations and which may be used in receivers or transmitters, but it should be understood that the invention may also be used in over 90% of communication synchronization circuits. In particular, this includes SONET and Digital Cross Connect networks, voice and data switching networks and mobile communications.

While the invention has been described with reference to particular example embodiments, further modifications and improvements which will occur to those skilled in the art, may be made within the purview of the appended claims, without departing from the scope of the invention in its broader aspect.

Numerous modifications and variations of the present invention are possible in light of the above teachings. It is therefore to be understood that within the scope of the appended claims, the invention may be practised otherwise than as specifically described herein.

We claim:

1. A method for converting a digital input signal into an analog control voltage signal comprising the steps of:
   generating a DWC (density width code) signal based on the digital input signal;
   processing the DWC signal for producing a first set of digital signals, each having a duty cycle digitally controlled in accordance with the DWC signal; and
   generating the analog control voltage signal from the first set of digital signals.

2. A method as claimed in claim 1 wherein the digital input signal relate to the phase error between two signals.

3. A method as claimed in claim 2 wherein the step of processing comprises the steps of:
   selecting a clock signal having a predetermined pulse density and width;
   controlling the pulse density of the clock signal based on the DWC signal for producing the first set of digital signals with one of a coarsely adjusted duty cycle and a finely adjusted duty cycle; and
   controlling the pulse width of the clock signal based on the DWC signal for producing the first set of digital signals with the other of a coarsely adjusted duty cycle and a finely adjusted duty cycle.

4. A method as claimed in claim 3 wherein the step of selecting a clock signal comprises the steps of:
   generating, a low frequency clock signal;
   generating a high frequency clock signal; and
   selecting the clock signal from one of the low frequency clock signal and the high frequency clock signal.

5. A method as claimed in claim 3 wherein the step of controlling the pulse density of the clock signal based on the DWC signal comprises the steps of:
   separating the DWC signal into a WDP_UP signal and a WDP_DN signal;
   resetting a first and second density counter operating at the clock signal rate with respective WDP_UP and WDP_DN signals;
   detecting all-zero states of the first and second density counter; and
   latching, in a corresponding first and second FF (flip-flop) gate, the all-zero states of the first and second density counter for a complete period of the clock signal to produce the first set of digital signals with one of a coarsely adjusted duty cycle and a finely adjusted duty cycle.

6. A method as claimed in claim 3 wherein the step of controlling the pulse width of the clock signal based on the DWC signal comprises the steps of:
   separating the DWC signal into a WEC_UP signal and a WEC_DN signal; and
   extending, in a first and second pulse width extender unit, the pulse width of the clock signal based on respective WEC_UP and WEC_DN signals for producing the first set of digital signals with the other of a coarsely adjusted duty cycle and a finely adjusted duty cycle.

7. A method as claimed in claim 6 wherein the step of extending, in the first pulse width extender unit, the pulse width of the clock signal consists of inserting, in the clock signal path, a plurality of delay elements based on the WEC_UP signal.

8. A method as claimed in claim 6 wherein the step of extending, in the second pulse width extender unit, the pulse width of the clock signal consists of inserting, in the clock signal path, a plurality of delay elements based on the WEC_DN signal.

9. A method as claimed in claim 1 wherein the first set of digital signals comprises an UPP (up positive) signal, an UPN (up negative) signal, an DNP (down positive) signal and an DNN (down negative) signal.

10. A method as claimed in claim 9 wherein the UPP and UPN signals form a first pair of differential signals and are generated with a duty cycle similar to that of the DNP and DNN signals, the DNP and DNN signals forming a second pair of differential signals.

11. A method as claimed in claim 10 wherein the DWC signal is a multi-bit digital signal alternatively used to control the density and pulse width of the clock signal.

12. A method as claimed in claim 9 wherein the step of generating the analog control voltage signal from the first set of digital signals comprises the steps of:
   adding the UPP and DNN signals to obtain a first sum;
   adding the UPN and DNP signals to obtain a second sum;
   determining the difference between the first and second sum; and
   integrating the difference for obtaining the analog control voltage signal.

13. A method as claimed in claim 1 wherein the DWC signal is alternatively generated based on preprogrammed codes.

14. A method as claimed in claim 13 further comprising the steps of:

processing the DWC signal for producing a second set of digital signals, each having a duty cycle digitally controlled in accordance with the DWC signal; and alternatively generating the analog control voltage signal from the second set of digital signals.

15. A method as claimed in claim 14 wherein the step of processing comprises the steps of:

selecting a clock signal having a predetermined pulse density and width;

controlling the pulse density of the clock signal based on the DWC signal for producing the second set of digital signals with one of a coarsely adjusted duty cycle and a finely adjusted duty cycle; and controlling the pulse width of the clock signal based on the DWC signal for producing the second set of digital signals with the other of a coarsely adjusted duty cycle and a finely adjusted duty cycle.

16. A method as claimed in claim 15 wherein the step of selecting a clock signal comprises the steps of:

generating, a low frequency clock signal;

generating a high frequency clock signal; and selecting the clock signal from one of the low frequency clock signal and the high frequency clock signal.

17. A method as claimed in claim 15 wherein the step of controlling the pulse density of the clock signal based on the DWC signal comprises the steps of:

separating the DWC signal into a WDP_UP signal and a WDP_DN signal;

resetting a first and second density counter operating at the clock signal rate with respective WDP_UP and WDP_DN signals;

detecting all-zero states of the first and second density counters; and latching, in a corresponding first and second FF (flip-flop) gate, the all-zero states of the first and second density counter for a complete period of the clock signal to produce the second set of digital signals with one of a coarsely adjusted duty cycle and a finely adjusted duty cycle.

18. A method as claimed in claim 15 wherein the step of controlling the pulse width of the clock signal based on the DWC signal comprises the steps of:

separating the DWC signal into a WEC_UP signal and a WEC_DN signal; and extending, in a first and second pulse width extender unit, the pulse width of the clock signal based on respective WEC_UP and WEC_DN signals for producing the second set of digital signals with the other of a coarsely adjusted duty cycle and a finely adjusted duty cycle.

19. A method as claimed in claim 18 wherein the step of extending, in the first pulse width extender unit, the pulse width of the clock signal consists of inserting, in the clock signal path, a plurality of delay elements based on the WEC_UP signal.

20. A method as claimed in claim 18 wherein the step of extending, in the second pulse width extender unit, the pulse width of the clock signal consists of inserting, in the clock signal path, a plurality of delay elements based on the WEC_DN signal.

21. A method as claimed in claim 14 wherein the second set of digital signals comprises an AUP (analog up) signal and an AUN (analog down) signal forming a third pair of differential signals.

22. A method for converting a PWM (pulse width modulated) signal into an analog control voltage signal comprising the steps of:

generating a DWC (density width code) signal based on preprogrammed codes;

processing the DWC signal and the PWM signal for producing a first set of digital signals, each having a duty cycle digitally controlled in accordance with the DWC signal; and generating the analog control voltage signal from the first set of digital signals.

23. A method as claimed in claim 22 wherein the PWM signal relate to the phase error between two signals.

24. A method as claimed in claim 22 wherein the step of processing comprises the steps of:

selecting a clock signal having a predetermined pulse density and width; and controlling the pulse density of the clock signal based on the DWC signal for producing the first set of digital signals with a coarsely adjusted duty cycle.

25. A method as claimed in claim 24 wherein the step of selecting a clock signal comprises the steps of:

generating, a low frequency clock signal;

generating a high frequency clock signal; and selecting the clock signal from one of the low frequency clock signal and the high frequency clock signal.

26. A method as claimed in claim 24 wherein the step of controlling the pulse density of the clock signal based on the DWC signal comprises the steps of:

separating the DWC signal into a WDP_UP signal and a WDP_DN signal;

resetting a first and second density counter operating at the clock signal rate with respective WDP_UP and WDP_DN signals;

detecting all-zero states of the first and second density counter; and latching, in a corresponding first and second FF (flip-flop) gate, the all-zero states of the first and second density counter for a complete period of the clock signal to produce the first set of digital signals with a coarsely adjusted duty cycle.

27. A method as claimed in claim 22 wherein the first set of digital signals comprises an UPP (up positive) signal, an UPN (up negative) signal, an DNP (down positive) signal and an DNN (down negative) signal.

28. A method as claimed in claim 27 wherein the UPP and UPN signals form a first pair of differential signals and are generated with a duty cycle similar to that of the DNP and DNN signals, the DNP and DNN signals forming a second pair of differential signals.

29. A method as claimed in claim 28, wherein the DWC signal is a multi-bit digital signal used to control the pulse density of the clock signal.

30. A method as claimed in claim 27 wherein the step of generating the analog control voltage signal from the first set of digital signals comprises the steps of:

adding the UPP and DNN signals to obtain a first sum;

adding the UPN and DNP signals to obtain a second sum;

determining the difference between the first and second sum; and integrating the difference for obtaining the analog control voltage signal.

31. A method as claimed in claim 22 further comprising the steps of:

processing the DWC signal and the PWM for producing a second set of digital signals, each having a duty cycle digitally controlled in accordance with the DWC signal; and alternatively generating the analog control voltage signal from the second set of digital signals.

32. A method as claimed in claim 31 wherein the step of processing comprises the steps of:
   selecting a clock signal having a predetermined pulse density and width; and
   controlling, in the PEG unit, the pulse density of the clock signal based on the DWC signal for producing the second set of digital signals with a coarsely adjusted duty cycle.

33. A method as claimed in claim 32 wherein the step of selecting a clock signal comprises the steps of:
   generating, a low frequency clock signal;
   generating a high frequency clock signal; and
   selecting the clock signal from one of the low frequency clock signal and the high frequency clock signal.

34. A method as claimed in claim 32 wherein the step of controlling the pulse density of the clock signal based on the DWC signal comprises the steps of:
   separating the DWC signal into a WDP_UP signal and a WDP_DN signal;
   resetting a first and second density counter operating at the clock signal rate with respective WDP_UP and WDP_DN signals;
   detecting all-zero states of the first and second density counters; and
   latching, in a corresponding first and second FF (flip-flop) gate, the all-zero states of the first and second density counter for a complete period of the clock signal to produce the second set of digital signals with a coarsely adjusted duty cycle.

35. A method as claimed in claim 31 wherein the second set of digital signals comprises an AUP (analog up) signal and an AUN (analog down) signal forming a third pair of differential signals.

36. A method as claimed in claim 35 wherein the step of alternatively generating the analog control voltage signal from the second set of digital signals comprises the steps of:
   determining the difference between the AUP and AUN signals; and
   integrating the difference for obtaining the analog control voltage signal.

37. A DCDCI (digitally controlled duty cycle integration) circuit for converting a digital input signal into an analog control voltage signal comprising:
   a PEG (phase error generator) for receiving a DWC (density width code) signal based on the digital input signal to produce a first set of digital signals, each having a duty cycle digitally controlled in accordance with the DWC signal; and
   a converter for generating the control voltage signal from the first set of digital signals.

38. A DCDCI circuit as claimed in claim 37 wherein the PEG comprises:
   a clock signal selector for selecting a clock signal having a predetermined pulse density and width from one of a low frequency clock signal and a high frequency clock signal;
   a pulse density dividing circuit to control the pulse density of the clock signal based on the DWC signal for producing the first set of digital signals with one of a coarsely adjusted duty cycle and a finely adjusted duty cycle; and
   a first and second pulse width extender to control the pulse width of the clock signal based on the DWC signal for producing the first set of digital signals with the other of a coarsely adjusted duty cycle and a finely adjusted duty cycle.

39. A DCDCI circuit as claimed in claim 38 in combination with a CU (control unit) for generating the low frequency clock signal and the high frequency clock signal.

40. A DCDCI circuit as claimed in claim 38 wherein the pulse density dividing circuit comprises:
   a first and second density counter respectively connected to receive a WDP_UP signal and a WDP_DN signal;
   a first and second all-zero detector for detecting all-zero states of respective first and second density counter; and
   a first and second FF (flip-flop) gate for respectively latching the all-zero states of the first and second density counter to produce the first set of digital signals with one of a coarsely adjusted duty cycle and a finely adjusted duty cycle.

41. A DCDCI circuit as claimed in claim 38 wherein the first pulse width extender comprises a plurality of delay elements for extending the pulse width of the clock signal based on a WEC_UP signal.

42. A DCDCI circuit as claimed in claim 38 wherein the second pulse width extender comprises a plurality of delay elements for extending the pulse width of the clock signal based on a WEC_DN signal.

43. A DCDCI circuit as claimed in claim 37 wherein the first set of digital signals comprises an UPP (up positive) signal, an UPN (up negative) signal, a DNP (down positive) signal and a DNN (down negative) signal.

44. A DCDCI circuit as claimed in claim 43 for converting a PWM (pulse width modulated) signal into an analog control voltage signal comprising:
   the PEG (phase error generator) for receiving the PWM signal and the DWC signal alternatively based on preprogrammed codes to produce the first set of digital signals, each having a duty cycle digitally controlled in accordance with the DWC signal; and
   the converter for generating the control voltage signal from the first set of digital signals.

45. A DCDCI as claimed in claim 44 wherein the converter consists of an AC-DC (alternating current-direct current) converter and comprises:
   a first adding circuit connected to a first input of an operational amplifier for summing the UPN and DNP signals to obtain a first sum;
   a second adding circuit connected to a second input of the operational amplifier for summing the UPP and DNN signals to obtain a second sum; and
   an operational amplifier connected as an attenuator for attenuating the difference between the first and second sum and as an integrator for integrating the difference.

46. A DCDCI (digitally controlled duty cycle integration) circuit for converting one of a digital input signal and a PWM (pulse width modulated) signal into an analog control voltage signal comprising:
   a PEG (phase error generator) for receiving the PWM signal and a DWC (density width code) signal based on one of the digital input signal and preprogrammed codes to produce a first and second set of digital signals, each having a duty cycle digitally controlled in accordance with the DWC signal; and
   a converter for generating a control voltage signal from one of the first and second set of digital signals.

47. A DCDCI circuit as claimed in claim 46 wherein the PEG comprises:

a clock signal selector for selecting a clock signal having a predetermined pulse density and width from one of a low frequency clock signal and a high frequency clock signal;

a pulse density dividing circuit to control the pulse density of the clock signal based on the DWC signal for producing the first and second set of digital signals with one of a coarsely adjusted duty cycle and a finely adjusted duty cycle; and a first and second pulse width extender to control the pulse width of the clock signal based on the DWC signal for producing the first set of digital signals with the other of a coarsely adjusted duty cycle and a finely adjusted duty cycle.

48. A DCDCI circuit as claimed in claim 47 in combination with a CU (control unit) for generating the low frequency clock signal and the high frequency clock signal.

49. A DCDCI circuit as claimed in claim 47 wherein the pulse density dividing circuit comprises:

a first and second density counter respectively connected to receive a WDP_UP signal and a WDP_DN signal;

a first and second all-zero detector for detecting all-zero states of respective first and second density counter; and a first and second FF (flip-flop) gate for respectively latching the all-zero states of the first and second density counter to produce the first and second set of digital signals with one of a coarsely adjusted duty cycle and a finely adjusted duty cycle.

50. A DCDCI circuit as claimed in claim 47 wherein the first pulse width extender comprises a plurality of delay elements for extending the pulse width of the clock signal based on a WEC_UP signal.

51. A DCDCI circuit as claimed in claim 47 wherein the second pulse width extender comprises a plurality of delay elements for extending the pulse width of the clock signal based on a WEC_DN signal.

52. A DCDCI circuit as claimed in claim 46 wherein the first set of digital signals comprises an UPP (up positive) signal, an UPN (up negative) signal, a DNP (down positive) signal and a DNN (down negative) signal.

53. A DCDCI circuit as claimed in claim 46 wherein the second set of digital signals comprises an AUP (analog up) signal and an AUN (analog down) signal.

54. A DCDCI as claimed in claim 53 wherein the converter consists of an AC-DC (alternating current-direct current) converter and comprises:

a digital error attenuator for receiving the first set of digital signals and generating a first control voltage step;

an analog error amplifier for receiving the second set of digital signals and generating a second voltage step; and an integrator for receiving one of the first and second voltage step, and producing the analog control voltage signal.

55. A DCDCI as claimed in claim 54 wherein the digital error attenuator comprises:

a first adding circuit connected to a first input of an operational amplifier for summing the UPN and DNP signals to obtain a first sum;

a second adding circuit connected to a second input of the operational amplifier for summing the UPP and DNN signals to obtain a second sum; and an operational amplifier connected as an attenuator for attenuating the difference between the first and second sum to provide the first control voltage step.

56. A DCDCI as claimed in claim 54 wherein the analog error amplifier comprises an operational amplifier connected to receive the AUP and ADN signals to provide the second control voltage step.

57. A DCDCI as claimed in claim 56 further comprising a switch for selecting one of the first and second voltage step from the output of the respective digital error attenuator and analog error amplifier.

58. A DCDCI as claimed in claim 54 wherein the integrator comprises an operational amplifier connected as an integrator for integrating one of the first and second control voltage step to produce the analog control voltage.

* * * * *